US010404297B2

(12) United States Patent
Choi et al.

(10) Patent No.: US 10,404,297 B2
(45) Date of Patent: Sep. 3, 2019

(54) SYSTEMS AND METHODS FOR OUT-OF-BAND INTERFERENCE MITIGATION

(71) Applicant: Kumu Networks, Inc., Sunnyvale, CA (US)

(72) Inventors: Jung-Il Choi, Sunnyvale, CA (US); Mayank Jain, Sunnyvale, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/262,045

(22) Filed: Jan. 30, 2019

(65) Prior Publication Data

US 2019/0165821 A1 May 30, 2019

Related U.S. Application Data

(63) Continuation of application No. 15/378,180, filed on Dec. 14, 2016, now Pat. No. 9,800,275, and a (Continued)

(51) Int. Cl.
*H04B 1/10* (2006.01)
*H04B 1/04* (2006.01)

(52) U.S. Cl.
CPC ............ *H04B 1/0475* (2013.01); *H04B 1/10* (2013.01); *H04B 1/109* (2013.01); *H04B 1/1027* (2013.01);
(Continued)

(58) Field of Classification Search
CPC combination set(s) only.
See application file for complete search history.

(56) References Cited

U.S. PATENT DOCUMENTS 3,922,617 A 11/1975 Denniston et al.
4,321,624 A 3/1982 Gibson et al.
(Continued)

FOREIGN PATENT DOCUMENTS

EP 0755141 A3 10/1998
EP 1959625 B1 2/2009
(Continued)

OTHER PUBLICATIONS

Bharadia et al., "Full Duplex Radios" SIGOMM, Aug. 12-16, 2013, Hong Kong, China, Copyright 2013 ACM 378-1-4503-2056-6/6/13/08, 12 pages.

(Continued)

*Primary Examiner* — Linda Wong
(74) *Attorney, Agent, or Firm* — Jeffrey Schox; Thomas Gwinn

(57) ABSTRACT

A system for interference mitigation including a transmit coupler that samples the RF transmit signal to create a sampled RF transmit signal; a transmit analog canceller that transforms the RF transmit signal to an RF interference cancellation signal, according to a first configuration state; a first receive coupler that combines the RF interference cancellation signal and the RF receive signal to generate a composite RF receive signal; a sampling analog interference filtering system that, in order to remove interference in the transmit band, filters the sampled RF transmit signal to generate a cleaned transmit signal; a first frequency downconverter that converts the transmit signal to a BB transmit signal; a second frequency downconverter that converts the composite RF receive signal to a composite BB receive signal; and an analog-to-digital converter that converts the transmit signal to a digital transmit signal.

16 Claims, 15 Drawing Sheets

Related U.S. Application Data continuation of application No. 15/706,547, filed on Sep. 15, 2017, now Pat. No. 10,230,410.

(60) Provisional application No. 62/268,400, filed on Dec. 16, 2015.

(52) U.S. Cl.
CPC ... *H04B 1/1036* (2013.01); *H04B 2001/0491* (2013.01); *H04B 2001/1045* (2013.01); *H04B 2001/1072* (2013.01)

(56) References Cited

U.S. PATENT DOCUMENTS 4,952,193 A 8/1990 Talwar
5,212,827 A 5/1993 Meszko et al.
5,691,978 A 11/1997 Kenworthy
5,734,967 A 3/1998 Kotzin et al.
5,790,658 A 8/1998 Yip et al.
5,818,385 A 10/1998 Bartholomew
5,930,301 A 7/1999 Chester et al.
6,215,812 B1 4/2001 Young et al.
6,240,150 B1 5/2001 Darveau et al.
6,411,250 B1 6/2002 Oswald et al.
6,539,204 B1 3/2003 Marsh et al.
6,567,649 B2 5/2003 Souissi
6,580,771 B2 6/2003 Kenney
6,639,551 B2 10/2003 Li et al.
6,657,950 B1 12/2003 Jones et al.
6,686,879 B2 2/2004 Shattil
6,725,017 B2 4/2004 Blount et al.
6,907,093 B2 6/2005 Blount et al.
6,915,112 B1 7/2005 Sutton et al.
6,965,657 B1 11/2005 Rezvani et al.
6,985,705 B2 1/2006 Shohara
7,057,472 B2 6/2006 Fukamachi et al.
7,110,381 B1 9/2006 Osullivan et al.
7,139,543 B2 11/2006 Shah
7,177,341 B2 2/2007 McCorkle
7,228,104 B2 6/2007 Collins et al.
7,266,358 B2 9/2007 Hillstrom
7,302,024 B2 11/2007 Arambepola
7,336,128 B2 2/2008 Suzuki et al.
7,336,940 B2 2/2008 Smithson
7,348,844 B2 3/2008 Jaenecke
7,349,505 B2 3/2008 Blount et al.
7,362,257 B2 4/2008 Bruzzone et al.
7,372,420 B1 5/2008 Osterhues et al.
7,397,843 B2 7/2008 Grant et al.
7,426,242 B2 9/2008 Thesling
7,508,898 B2 3/2009 Cyr et al.
7,509,100 B2 3/2009 Toncich
7,706,755 B2 4/2010 Muhammad et al.
7,733,813 B2 6/2010 Shin et al.
7,773,759 B2 8/2010 Alves et al.
7,773,950 B2 8/2010 Wang et al.
7,778,611 B2 8/2010 Asai et al.
7,869,527 B2 1/2011 Vetter et al.
7,948,878 B2 5/2011 Briscoe et al.
7,962,170 B2 6/2011 Axness et al.
7,987,363 B2 7/2011 Chauncey et al.
7,999,715 B2 8/2011 Yamaki et al.
8,005,235 B2 8/2011 Rebandt et al.
8,023,438 B2 9/2011 Kangasmaa et al.
8,027,642 B2 9/2011 Proctor et al.
8,031,744 B2 10/2011 Radunovic et al.
8,032,183 B2 10/2011 Rudrapatna
8,036,606 B2 10/2011 Kenington
8,055,235 B1 11/2011 Gupta et al.
8,060,803 B2 11/2011 Kim
8,081,695 B2 12/2011 Chrabieh et al.
8,085,831 B2 12/2011 Teague
8,086,191 B2 12/2011 Fukuda et al.
8,090,320 B2 1/2012 Dent et al.
8,155,046 B2 4/2012 Jung et al.
8,155,595 B2 4/2012 Sarin et al.
8,160,176 B2 4/2012 Dent et al.
8,175,535 B2 5/2012 Mu
8,179,990 B2 5/2012 Orlik et al.
8,218,697 B2 7/2012 Guess et al.
8,270,456 B2 9/2012 Leach et al.
8,274,342 B2 9/2012 Tsutsumi et al.
8,306,480 B2 11/2012 Muhammad et al.
8,331,477 B2 12/2012 Huang et al.
8,349,933 B2 1/2013 Bhandari et al.
8,351,533 B2 1/2013 Shrivastava et al.
8,385,855 B2 2/2013 Lorg et al.
8,385,871 B2 2/2013 Wyville
8,391,878 B2 3/2013 Tenny
8,417,750 B2 4/2013 Yan et al.
8,422,412 B2 4/2013 Hahn
8,422,540 B1 4/2013 Negus et al.
8,428,542 B2 4/2013 Bornazyan
8,446,892 B2 5/2013 Ji et al.
8,457,549 B2 6/2013 Weng et al.
8,462,697 B2 6/2013 Park et al.
8,467,757 B2 6/2013 Ahn
8,498,585 B2 7/2013 Vandenameele
8,502,924 B2 8/2013 Liou et al.
8,509,129 B2 8/2013 Deb et al.
8,521,090 B2 8/2013 Kim et al.
8,576,752 B2 11/2013 Sarca
8,611,401 B2 12/2013 Lakkis
8,619,916 B2 12/2013 Jong
8,625,686 B2 1/2014 Li et al.
8,626,090 B2 1/2014 Dalipi
8,649,417 B2 2/2014 Baldemair et al.
8,711,943 B2 4/2014 Rossato et al.
8,743,674 B2 6/2014 Parnaby et al.
8,744,377 B2 6/2014 Rimini et al.
8,750,786 B2 6/2014 Larsson et al.
8,755,756 B1 6/2014 Zhang et al.
8,767,869 B2 7/2014 Rimini et al.
8,787,907 B2 7/2014 Jain et al.
8,798,177 B2 8/2014 Park et al.
8,804,975 B2 8/2014 Harris et al.
8,837,332 B2 9/2014 Khojastepour et al.
8,842,584 B2 9/2014 Jana et al.
8,879,433 B2 11/2014 Khojastepour et al.
8,879,811 B2 11/2014 Liu et al.
8,913,528 B2 12/2014 Cheng et al.
8,929,550 B2 1/2015 Shattil et al.
8,937,874 B2 1/2015 Gainey et al.
8,942,314 B2 1/2015 Aparin
8,995,410 B2 3/2015 Balan et al.
8,995,932 B2 3/2015 Wyville
9,014,069 B2 4/2015 Patil et al.
9,019,849 B2 4/2015 Hui et al.
9,031,567 B2 5/2015 Haub
9,042,838 B2 5/2015 Braithwaite
9,054,795 B2 6/2015 Choi et al.
9,065,519 B2 6/2015 Cyzs et al.
9,077,421 B1 7/2015 Mehlman et al.
9,112,476 B2 8/2015 Basaran et al.
9,124,475 B2 9/2015 Li et al.
9,130,747 B2 9/2015 Zinser et al.
9,136,883 B1 9/2015 Moher et al.
9,160,430 B2 10/2015 Maltsev et al.
9,184,902 B2 11/2015 Khojastepour et al.
9,185,711 B2 11/2015 Lin et al.
9,231,647 B2 1/2016 Polydoros et al.
9,231,712 B2 1/2016 Hahn et al.
9,236,996 B2 1/2016 Khandani
9,264,024 B2 2/2016 Shin et al.
9,312,895 B1 4/2016 Gupta et al.
9,325,432 B2 4/2016 Hong et al.
9,331,737 B2 5/2016 Hong et al.
9,413,500 B2 8/2016 Chincholi et al.
9,413,516 B2 * 8/2016 Khandani .............. H04B 1/525
9,455,756 B2 9/2016 Choi et al.
9,461,698 B2 10/2016 Moffatt et al.
9,479,198 B2 10/2016 Moher et al.
9,490,918 B2 11/2016 Negus et al.

(56) References Cited

U.S. PATENT DOCUMENTS 9,490,963 B2 11/2016 Choi et al.
9,537,543 B2 * 1/2017 Choi ........................ H04B 3/23
9,559,734 B2 1/2017 Hwang et al.
9,621,221 B2 4/2017 Hua et al.
9,742,593 B2 8/2017 Moorti et al.
2002/0034191 A1 3/2002 Shattil
2002/0064245 A1 5/2002 McCorkle
2002/0072344 A1 6/2002 Souissi
2002/0109631 A1 8/2002 Li et al.
2002/0154717 A1 10/2002 Shima et al.
2002/0172265 A1 11/2002 Kenney
2003/0031279 A1 2/2003 Blount et al.
2003/0099287 A1 5/2003 Arambepola
2003/0104787 A1 6/2003 Blount et al.
2003/0148748 A1 8/2003 Shah
2004/0106381 A1 6/2004 Tiller
2004/0266378 A1 12/2004 Fukamachi et al.
2005/0030888 A1 2/2005 Thesling
2005/0078743 A1 4/2005 Shohara
2005/0101267 A1 5/2005 Smithson
2005/0129152 A1 6/2005 Hillstrom
2005/0159128 A1 7/2005 Collins et al.
2005/0190870 A1 9/2005 Blount et al.
2005/0250466 A1 11/2005 Varma et al.
2005/0254555 A1 11/2005 Teague
2005/0282500 A1 12/2005 Wang et al.
2006/0029124 A1 2/2006 Grant et al.
2006/0030277 A1 2/2006 Cyr et al.
2006/0058022 A1 3/2006 Webster et al.
2006/0083297 A1 4/2006 Yan et al.
2006/0209754 A1 9/2006 Ji et al.
2006/0240769 A1 10/2006 Proctor et al.
2006/0273853 A1 12/2006 Suzuki et al.
2007/0018722 A1 1/2007 Jaenecke
2007/0105509 A1 5/2007 Muhammad et al.
2007/0207747 A1 9/2007 Johnson et al.
2007/0207748 A1 9/2007 Toncich
2007/0249314 A1 10/2007 Sanders et al.
2007/0274372 A1 11/2007 Asai et al.
2007/0283220 A1 12/2007 Kim
2007/0296625 A1 12/2007 Bruzzone et al.
2008/0037801 A1 2/2008 Alves et al.
2008/0089397 A1 4/2008 Vetter et al.
2008/0107046 A1 5/2008 Kangasmaa et al.
2008/0111754 A1 5/2008 Osterhues et al.
2008/0131133 A1 6/2008 Blunt et al.
2008/0144852 A1 6/2008 Rebandt et al.
2008/0192636 A1 8/2008 Briscoe et al.
2008/0219339 A1 9/2008 Chrabieh et al.
2008/0219377 A1 9/2008 Nisbet
2008/0279122 A1 11/2008 Fukuda et al.
2009/0022089 A1 1/2009 Rudrapatna
2009/0034437 A1 2/2009 Shin et al.
2009/0047914 A1 2/2009 Axness et al.
2009/0115912 A1 5/2009 Liou et al.
2009/0180404 A1 7/2009 Jung et al.
2009/0186582 A1 7/2009 Muhammad et al.
2009/0213770 A1 8/2009 Mu
2009/0221231 A1 9/2009 Murch et al.
2009/0262852 A1 10/2009 Orlik et al.
2009/0303908 A1 12/2009 Deb et al.
2010/0014600 A1 1/2010 Li et al.
2010/0014614 A1 1/2010 Leach et al.
2010/0022201 A1 1/2010 Vandenameele
2010/0031036 A1 2/2010 Chauncey et al.
2010/0056166 A1 3/2010 Tenny
2010/0103900 A1 4/2010 Ann et al.
2010/0117693 A1 5/2010 Buer et al.
2010/0136900 A1 6/2010 Seki
2010/0150032 A1 6/2010 Zinser et al.
2010/0150033 A1 6/2010 Zinser et al.
2010/0150070 A1 6/2010 Chae et al.
2010/0159858 A1 6/2010 Dent et al.
2010/0197231 A1 8/2010 Kenington
2010/0208854 A1 8/2010 Guess et al.
2010/0215124 A1 8/2010 Zeong et al.
2010/0226356 A1 9/2010 Sarin et al.
2010/0226416 A1 9/2010 Dent et al.
2010/0226448 A1 9/2010 Dent
2010/0232324 A1 9/2010 Radunovic et al.
2010/0266057 A1 10/2010 Shrivastava et al.
2010/0277289 A1 11/2010 Brauner et al.
2010/0278085 A1 11/2010 Hahn
2010/0279602 A1 11/2010 Larsson et al.
2010/0284447 A1 11/2010 Gore et al.
2010/0295716 A1 11/2010 Yamaki et al.
2011/0013684 A1 1/2011 Semenov et al.
2011/0013735 A1 1/2011 Huang et al.
2011/0026509 A1 2/2011 Tanaka
2011/0081880 A1 4/2011 Ann
2011/0149714 A1 * 6/2011 Rimini .................. H04B 1/525
370/201
2011/0171922 A1 7/2011 Kim et al.
2011/0216813 A1 9/2011 Baldemair et al.
2011/0222631 A1 9/2011 Jong
2011/0227664 A1 9/2011 Wyville
2011/0243202 A1 10/2011 Lakkis
2011/0250858 A1 10/2011 Jain et al.
2011/0254639 A1 10/2011 Tsutsumi et al.
2011/0256857 A1 10/2011 Chen et al.
2011/0268232 A1 11/2011 Park et al.
2011/0311067 A1 12/2011 Harris et al.
2011/0319044 A1 12/2011 Bornazyan
2012/0021153 A1 1/2012 Bhandari et al.
2012/0052892 A1 3/2012 Braithwaite
2012/0063369 A1 3/2012 Lin et al.
2012/0063373 A1 3/2012 Chincholi et al.
2012/0140685 A1 6/2012 Lederer et al.
2012/0140860 A1 6/2012 Rimini et al.
2012/0147790 A1 6/2012 Khojastepour et al.
2012/0154249 A1 6/2012 Khojastepour et al.
2012/0155335 A1 6/2012 Khojastepour et al.
2012/0155336 A1 6/2012 Khojastepour et al.
2012/0201153 A1 8/2012 Bharadia et al.
2012/0201173 A1 8/2012 Jain et al.
2012/0224497 A1 9/2012 Lindoff et al.
2013/0005284 A1 1/2013 Dalipi
2013/0040555 A1 * 2/2013 Rimini .................. H04B 1/109
455/1
2013/0044791 A1 2/2013 Rimini et al.
2013/0077502 A1 3/2013 Gainey et al.
2013/0089009 A1 4/2013 Li et al.
2013/0114468 A1 5/2013 Hui et al.
2013/0120190 A1 5/2013 McCune
2013/0142030 A1 6/2013 Parnaby et al.
2013/0155913 A1 6/2013 Sarca
2013/0166259 A1 6/2013 Weber et al.
2013/0194984 A1 8/2013 Cheng et al.
2013/0215805 A1 8/2013 Hong et al.
2013/0225101 A1 8/2013 Basaran et al.
2013/0253917 A1 9/2013 Schildbach
2013/0259343 A1 10/2013 Liu et al.
2013/0286903 A1 10/2013 Khojastepour et al.
2013/0294523 A1 11/2013 Rossato et al.
2013/0301487 A1 11/2013 Khandani
2013/0301488 A1 11/2013 Hong et al.
2013/0308717 A1 11/2013 Maltsev et al.
2013/0315211 A1 11/2013 Balan et al.
2014/0011461 A1 1/2014 Bakalski et al.
2014/0016515 A1 1/2014 Jana et al.
2014/0036736 A1 2/2014 Wyville
2014/0072072 A1 3/2014 Ismail et al.
2014/0126437 A1 5/2014 Patil et al.
2014/0140250 A1 * 5/2014 Kim ...................... H04B 1/525
370/278
2014/0169236 A1 6/2014 Choi et al.
2014/0185533 A1 7/2014 Haub
2014/0194073 A1 7/2014 Wyville et al.
2014/0206300 A1 7/2014 Hahn et al.
2014/0219139 A1 8/2014 Choi et al.
2014/0219449 A1 8/2014 Shattil et al.
2014/0269991 A1 9/2014 Aparin
2014/0313946 A1 10/2014 Azadet

(56) References Cited

U.S. PATENT DOCUMENTS

2014/0348018 A1* 11/2014 Bharadia .............. H04L 5/1461 370/252
2014/0348032 A1 11/2014 Hua et al.
2014/0349595 A1 11/2014 Cox
2014/0376416 A1 12/2014 Choi
2015/0049834 A1 2/2015 Choi et al.
2015/0094008 A1 4/2015 Maxim et al.
2015/0103745 A1 4/2015 Negus et al.
2015/0139122 A1 5/2015 Rimini et al.
2015/0146765 A1 5/2015 Moffatt et al.
2015/0156003 A1 6/2015 Khandani
2015/0156004 A1 6/2015 Khandani
2015/0171903 A1 6/2015 Mehlman et al.
2015/0180522 A1 6/2015 Wyville
2015/0188646 A1 7/2015 Bharadia et al.
2015/0215937 A1 7/2015 Khandani
2015/0249444 A1 9/2015 Shin et al.
2015/0270865 A1 9/2015 Polydoros et al.
2015/0280893 A1* 10/2015 Choi ..................... H04B 1/525 370/281
2015/0303984 A1 10/2015 Braithwaite
2015/0311928 A1* 10/2015 Chen ..................... H04B 1/525 375/350
2016/0043759 A1 2/2016 Choi et al.
2016/0056846 A1 2/2016 Moher et al.
2016/0105213 A1 4/2016 Hua et al.
2016/0119019 A1 4/2016 Pratt
2016/0119020 A1 4/2016 Charlon
2016/0182097 A1 6/2016 Jiang et al.
2016/0218769 A1 7/2016 Chang et al.
2016/0226653 A1* 8/2016 Bharadia ................ H04B 1/525
2016/0266245 A1 9/2016 Bharadia et al.
2016/0269061 A1 9/2016 Hwang et al.
2016/0285486 A1 9/2016 Qin et al.
2016/0294425 A1* 10/2016 Hwang .................. H04B 1/525
2016/0315754 A1* 10/2016 Wu ....................... H04L 5/0048
2016/0344432 A1* 11/2016 Hwang .................. H04B 1/525
2016/0380706 A1 12/2016 Tanzi et al.
2017/0041095 A1 2/2017 Hwang et al.
2017/0170948 A1* 6/2017 Eltawil .................. H04B 1/123
2017/0187513 A9 6/2017 Bharadia et al.
2018/0063745 A1* 3/2018 Jain .................. H04B 10/25752
2018/0227925 A1* 8/2018 Gebhard ............. H04W 72/082

FOREIGN PATENT DOCUMENTS

EP 2237434 A1 10/2010
EP 2267946 A2 12/2010
RU 2256985 C2 7/2005
WO 2013173250 A1 11/2013
WO 2013185106 A1 12/2013
WO 2014093916 A1 6/2014

OTHER PUBLICATIONS

International Search Report and Written Opinion for International Application No. PCT/US18/24577.

Mcmichael et al., "Optimal Tuning of Analog Self-Interference Cancellers for Full-Duple Wireless Communication", Oct. 1-5, 2012, Fiftieth Annual Allerton Conference, Illinois, USA, pp. 246-251.

* cited by examiner

PRIOR ART

SYSTEMS AND METHODS FOR OUT-OF-BAND INTERFERENCE MITIGATION

CROSS REFERENCE TO RELATED APPLICATIONS

This application is a continuation of U.S. patent application Ser. No. 15/706,547, filed 15 Sep. 2017, which is a continuation of U.S. patent application Ser. No. 15/378,180, filed on 14 Dec. 2016, which claims the benefit of U.S. Provisional Application Ser. No. 62/268,400, filed on 16 Dec. 2015, all of which are incorporated in their entireties by this reference.

TECHNICAL FIELD

This invention relates generally to the wireless communications field, and more specifically to new and useful systems and methods for out-of-band interference mitigation.

BACKGROUND

Traditional wireless communication systems are half-duplex; that is, they are not capable of transmitting and receiving signals simultaneously on a single wireless communications channel. One way that this issue is addressed is through the use of frequency division multiplexing (FDM), in which transmission and reception occur on different frequency channels. Unfortunately, the performance of FDM-based communication is limited by the issue of adjacent-channel interference (ACI), which occurs when a transmission on a first frequency channel contains non-negligible strength in another frequency channel used by a receiver. ACI may be addressed by increasing channel separation, but this in turn limits the bandwidth available for use in a given area. ACI may also be addressed by filtering, but the use of filters alone may result in inadequate performance for many applications. Thus, there is a need in the wireless communications field to create new and useful systems and methods for out-of-band interference mitigation. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Out-of-Band Interference Mitigation Systems

A system 1000 for out-of-band interference mitigation includes a receive band interference cancellation system (RxICS) 1300 and at least one of a transmit band interference cancellation system (TxICS) 1100 and a transmit band interference filtering system (TxIFS) 1200. The system 1000 may additionally or alternatively include a receive band filtering system (RxIFS) 1400. The system 1000 may additionally include any number of additional elements to enable interference cancellation and/or filtering, including signal couplers 1010, amplifiers 1020, frequency upconverters 1030, frequency downconverters 1040, analog-to-digital converters (ADC) 1050, digital-to-analog converters (DAC) 1060, time delays 1070, and any other circuit components (e.g., phase shifters, attenuators, transformers, filters, etc.).

The system 1000 is preferably implemented using digital and/or analog circuitry. Digital circuitry is preferably implemented using a general-purpose processor, a digital signal processor, an application specific integrated circuit (ASIC), a field programmable gate array (FPGA) and/or any suitable processor(s) or circuit(s). Analog circuitry is preferably implemented using analog integrated circuits (ICs) but may additionally or alternatively be implemented using discrete components (e.g., capacitors, resistors, transistors), wires, transmission lines, waveguides, digital components, mixed-signal components, or any other suitable components. The system 1000 preferably includes memory to store configuration data, but may additionally or alternatively be configured using externally stored configuration data or in any suitable manner.

The system 1000 functions to reduce interference present in a communications receiver resulting from transmission of a nearby transmitter on an adjacent communications channel (e.g., adjacent-channel interference). Adjacent-channel interference may result from either or both of a receiver receiving transmissions outside of a desired receive channel and a transmitter transmitting (either intentionally or via leakage) on the desired receive channel.

Figure 1:
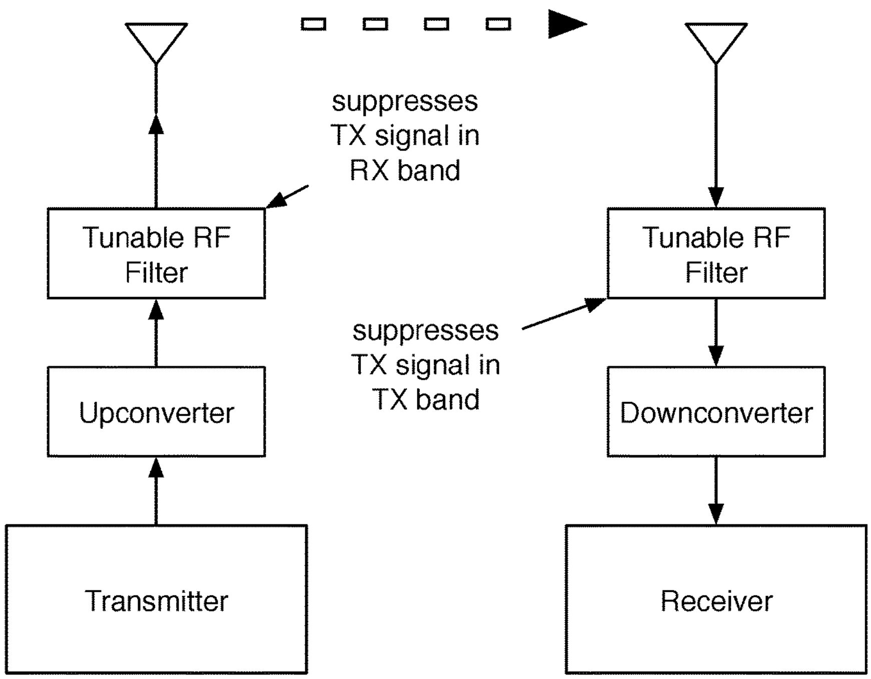
FIG. 1 is a prior art representation of out-of-band interference mitigation.

Traditionally, adjacent-channel interference has been mitigated using tunable or selectable filter-based architectures; for example, as shown in FIG. 1. On the transmit side, the tunable radio frequency (RF) filter is used to suppress the transmit signal in the receive band (e.g., a bandpass filter that only lets the transmit band pass). On the receive side, the tunable RF filter is generally used to suppress interference due to the transmitted signal in the transmit band (e.g., a bandpass filter that only lets the receive band pass). In some cases, this filter may also be used to selectively filter signal in the receive band as well.

This purely filter-based approach is limited primarily by its ability to remove interference in the receive band. Filtering in the receive band primarily occurs at the transmit side. Since, frequently, out-of-channel signal results from non-linear processes such as amplification, this filtering must generally occur at RF and after power amplification, which means that the transmit filter must both be able to reject a large amount of signal out-of-band without a large insertion loss. In other words, in these cases the filter must generally have a high quality factor (Q factor, Q), high insertion loss, or low interference rejection ability.

Likewise, the RF filter on the receive side must also be able to reject a large amount of signal out-of-band (since the transmit side filter does not filter the transmit band signal), and so it must also have high Q, high insertion loss, or low interference rejection ability. Note that these limitations are especially apparent in cases where the transmit and receive antennas are nearby (i.e., antenna isolation is low), because the amount of power that must be rejected by the RF filters increases; or when channel separation is small (and therefore filter Q must be higher).

The system 1000 provides improved interference mitigation by performing interference cancellation either as a substitute for or in addition to interference filtering. The system 1000 uses a receive band interference cancellation system (RxICS 1300) to remove interference in the receive band, as well as either or both of the transmit band interference cancellation system (TxICS 1100) and transmit band interference filtering system (TxIFS 1200) to remove interference in the transmit band.

The system 1000 may be arranged in various architectures including these elements, enabling flexibility for a number of applications. In some embodiments, the system 1000 may be attached or coupled to existing transceivers; additionally or alternatively, the system 1000 may be integrated into transceivers. Examples of architectures of the system 1000 are as shown in FIGS. 2-7.

Figure 2:
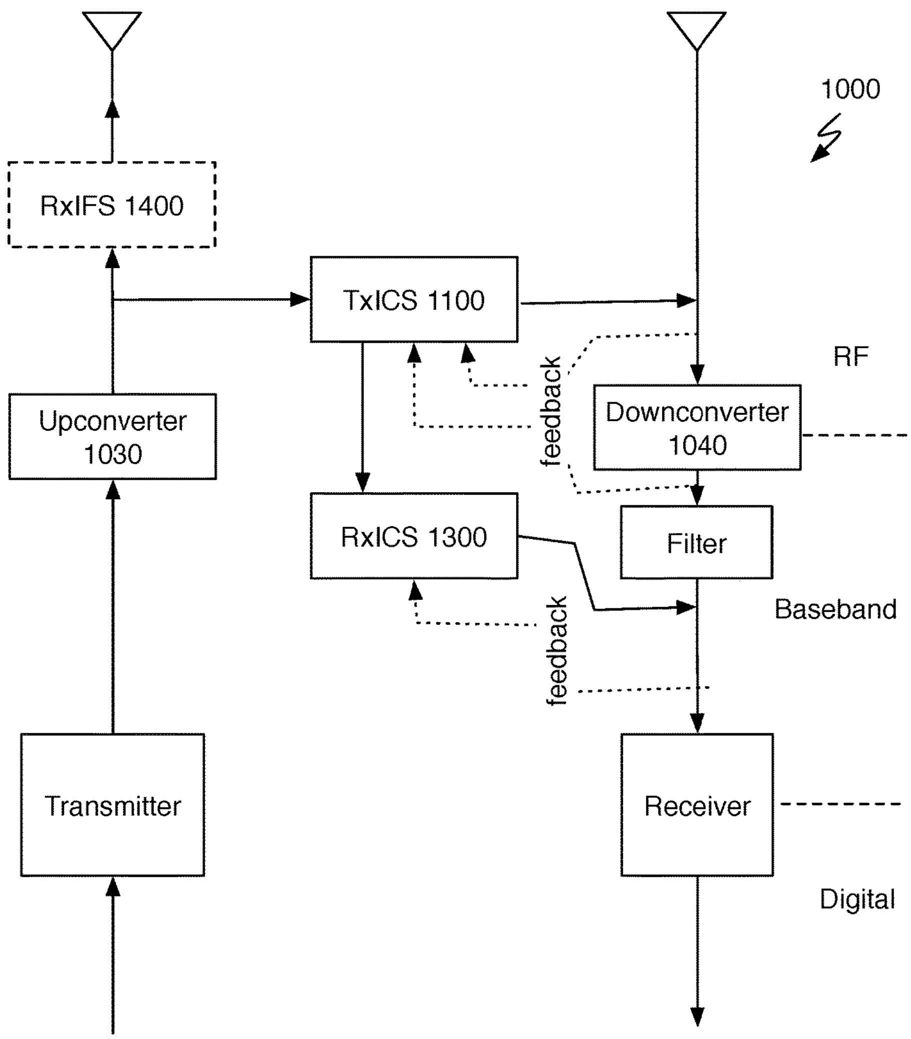
FIG. 2 is a diagram representation of a system of a preferred embodiment.

As shown in FIG. 2, the system 1000 may mitigate interference using the TxICS 1100 and RxICS 1300 (as well as optionally the RxIFS 1400), combining the RxICS 1300 interference cancellation with a baseband receive signal.

Figure 3:
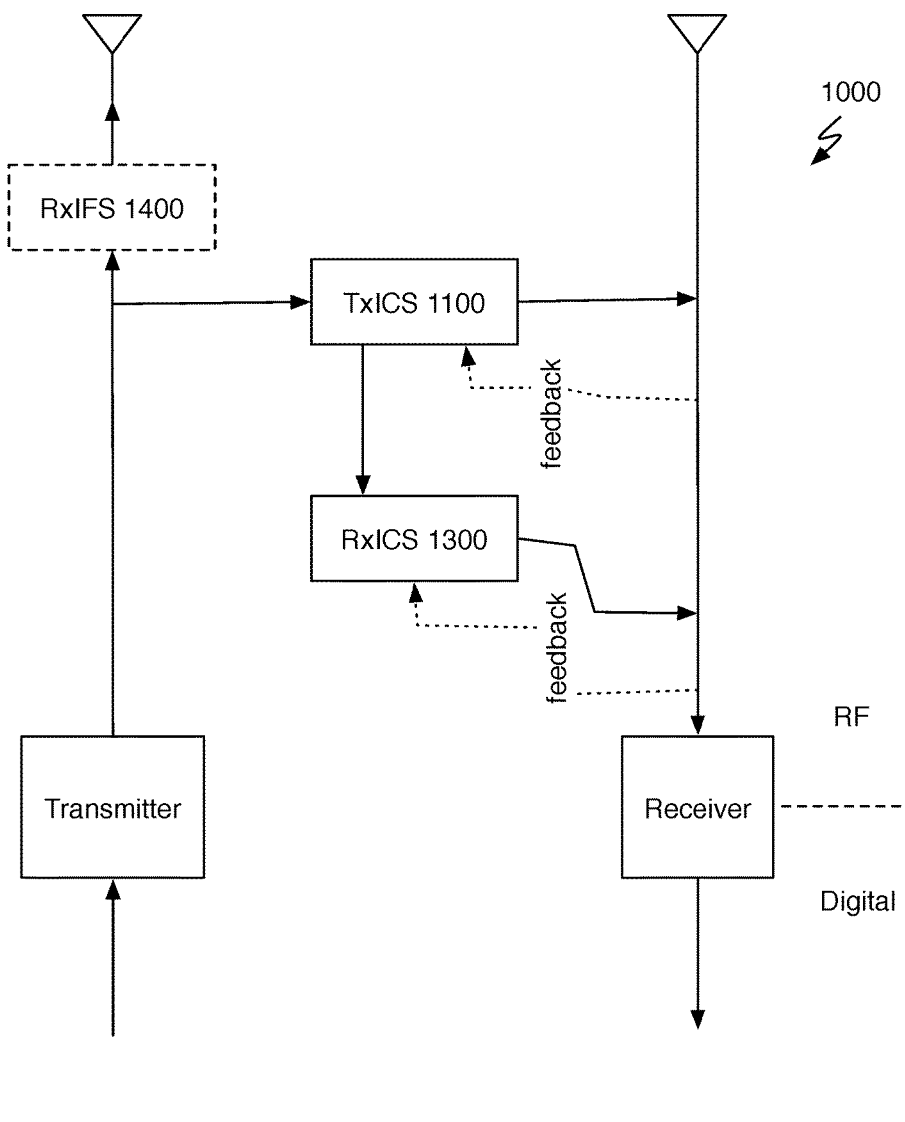
FIG. 3 is a diagram representation of a system of a preferred embodiment.

As shown in FIG. 3, the system 1000 may mitigate interference using the TxICS 1100 and RxICS 1300 (as well as optionally the RxIFS 1400), combining the RxICS 1300 interference cancellation with an RF receive signal.

Figure 4:
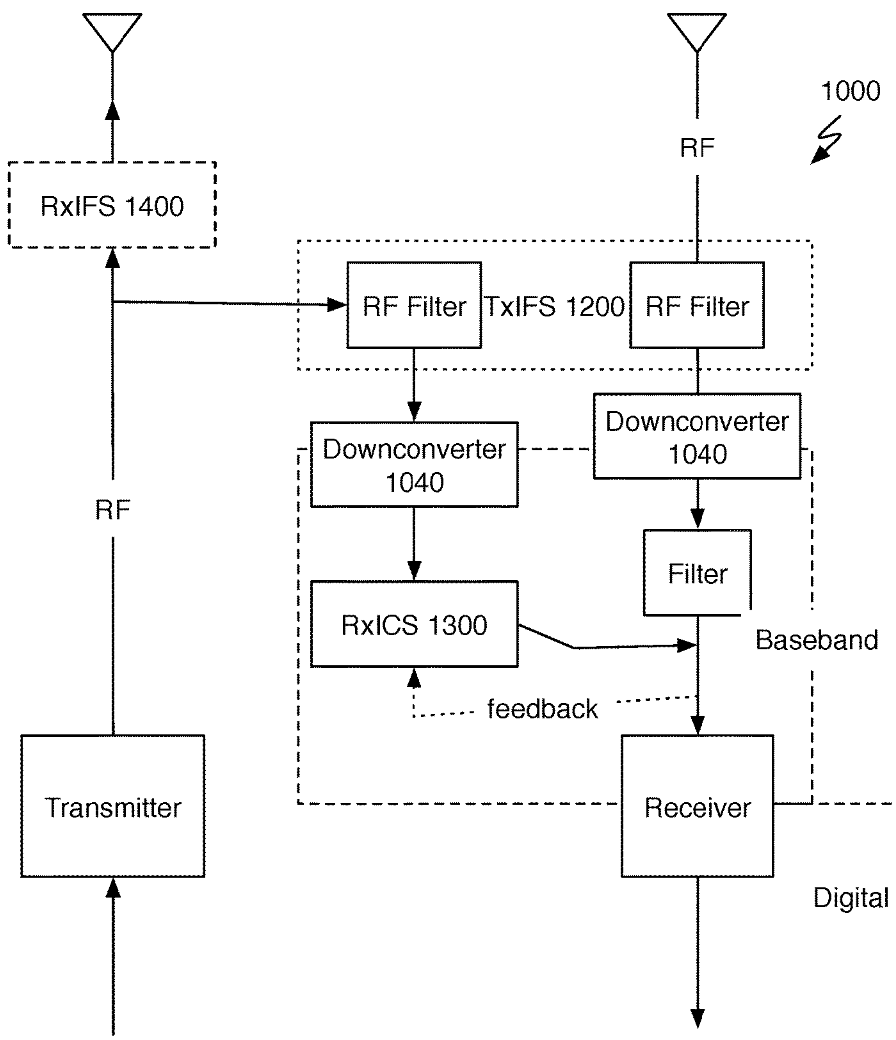
FIG. 4 is a diagram representation of a system of a preferred embodiment.

As shown in FIG. 4, the system 1000 may mitigate interference using the TxIFS 1200 and RxICS 1300 (as well as optionally the RxIFS 1400), combining the RxICS 1300 interference cancellation with a baseband receive signal.

Figure 5:
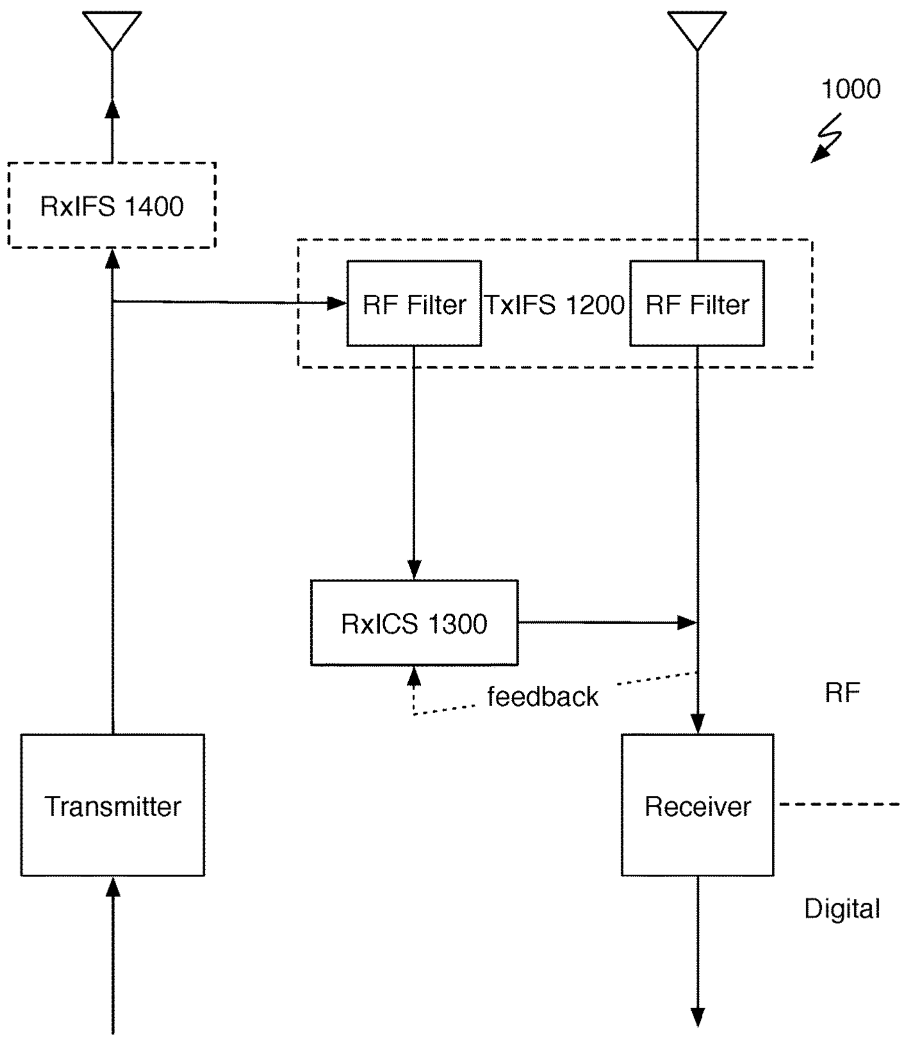
FIG. 5 is a diagram representation of a system of a preferred embodiment.

As shown in FIG. 5, the system 1000 may mitigate interference using the TxIFS 1200 and RxICS 1300 (as well as optionally the RxIFS 1400), combining the RxICS 1300 interference cancellation with an RF receive signal.

Figure 6:
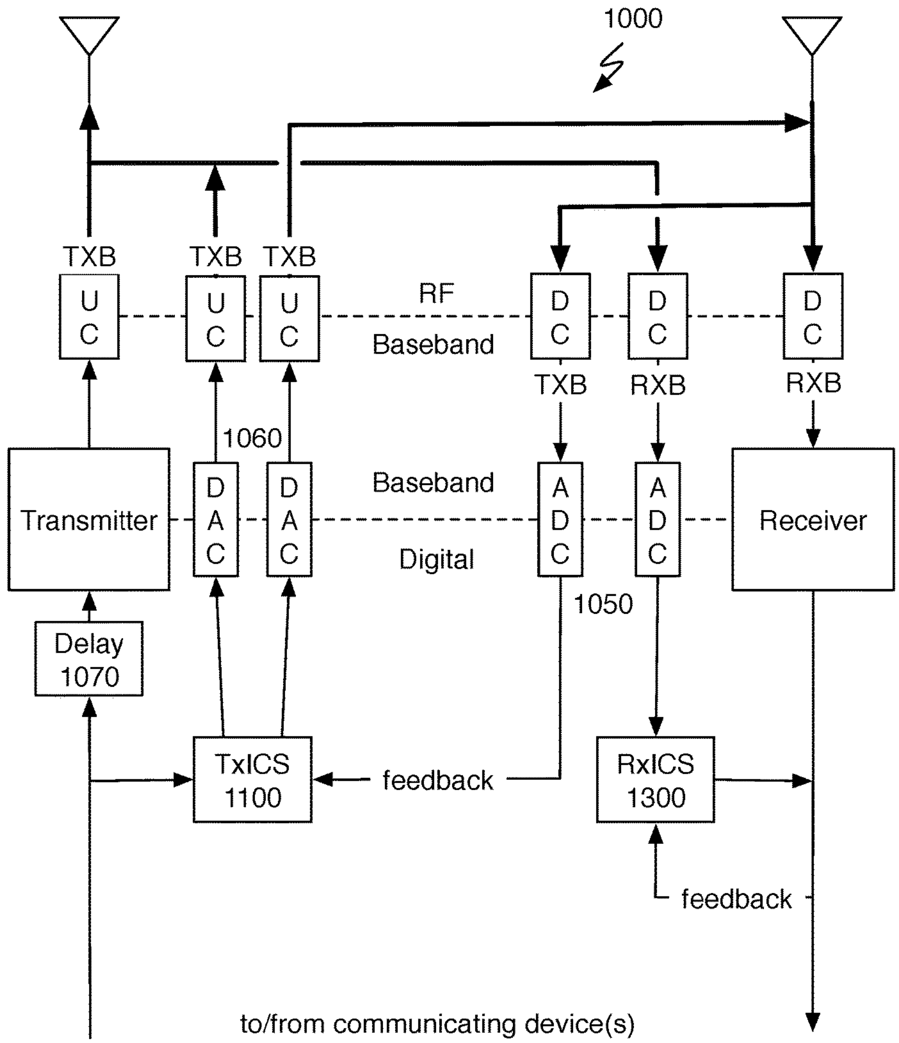
FIG. 6 is a diagram representation of a system of a preferred embodiment.

As shown in FIG. 6, the system 1000 may mitigate interference using the TxICS 1100 and RxICS 1300, combining the RxICS 1300 interference cancellation with a digital receive signal.

Figure 7:
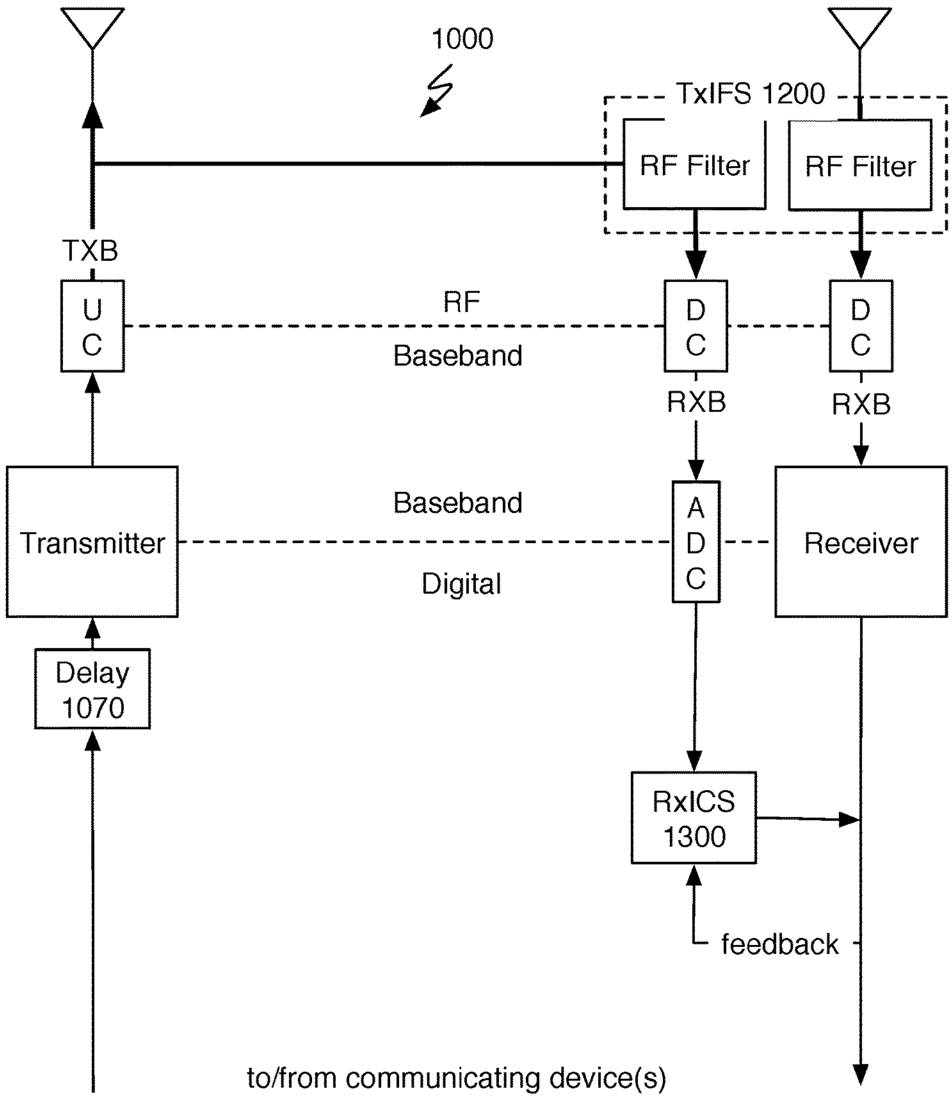
FIG. 7 is a diagram representation of a system of a preferred embodiment.

As shown in FIG. 7, the system 1000 may mitigate interference using the TxIFS 1200 and RxICS 1300, combining the RxICS 1300 interference cancellation with a digital receive signal.

Figure 8:
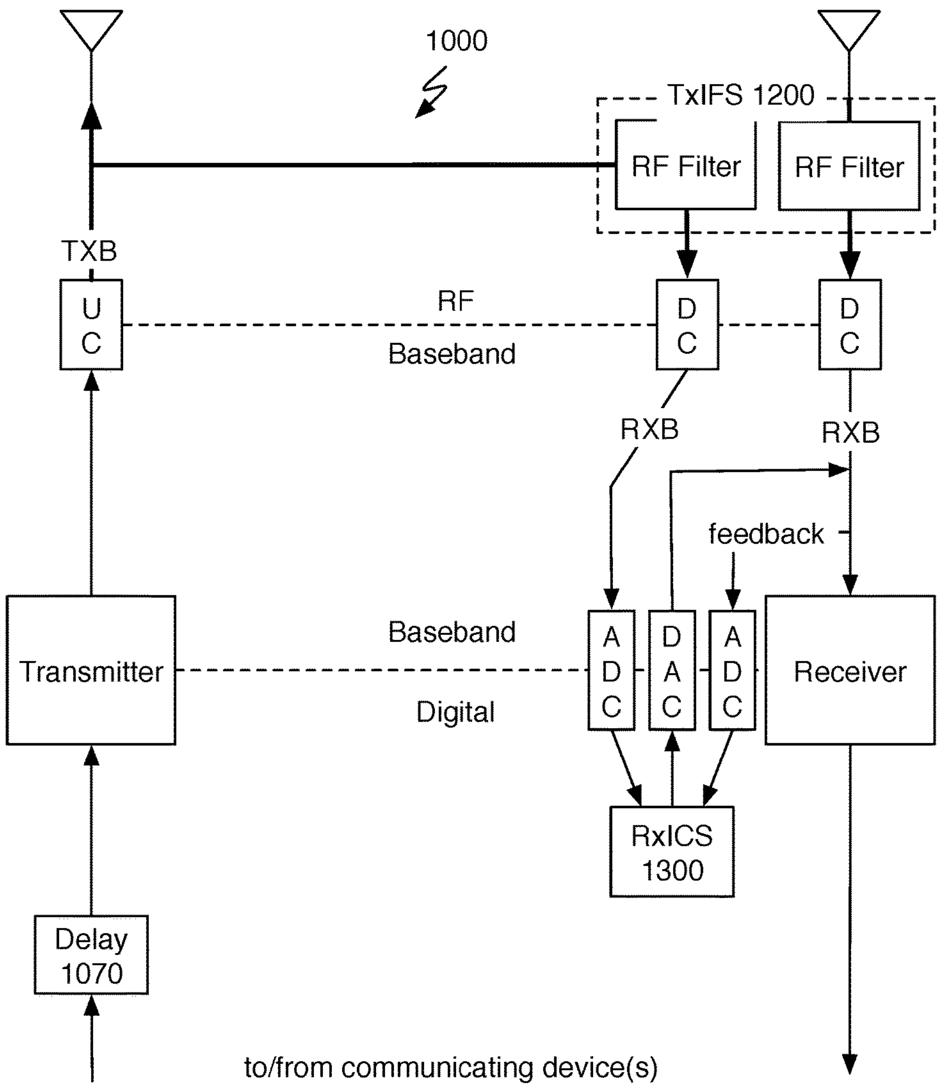
FIG. 8 is a diagram representation of a system of a preferred embodiment.

As shown in FIG. 8, the system 1000 may mitigate interference using the TxIFS 1200 and RxICS 1300, combining the RxICS 1300 interference cancellation with an analog receive signal.

In one implementation of a preferred embodiment, the RxICS 1300 can include a switchable output, enabling combination of the RxICS 1300 interference cancellation with a digital receive signal, an analog receive signal, and/or an RF receive signal. The RxICS 1300 may include an RxDC 1310 with an output switchable between a digital output, a baseband analog output (after digital-to-analog conversion), and an IF/RF analog output (after frequency upconversion of the analog output). Additionally or alternatively, the RxICS 1300 may include an RxAC 1320 with an output switchable between an RF output, a baseband/IF analog output (after frequency downconversion of the RF output), and a digital output (after analog-to-digital conversion of the analog output). Selection of which interference cancellation output to combine with the appropriate receive signal is preferably performed by a tuning circuit, but can additionally or alternatively be performed by any suitable controller. In this implementation, the tuning circuit preferably receives feedback signals from the receive path at the RF, baseband, and digital signal paths, and the output is selected (e.g., by the tuning circuit) according to changes in the feedback signal that are indicative of optimal interference-cancellation performance. Similarly, the TxICS 1100 can include a switchable output as described above, but directed to performing interference cancellation in the transmit band in lieu of the receive band.

The system 1000 is preferably coupled to or integrated with a receiver that functions to receive analog receive signals transmitted over a communications link (e.g., a wireless channel, a coaxial cable). The receiver preferably converts analog receive signals into digital receive signals for processing by a communications system, but may additionally or alternatively not convert analog receive signals (passing them through directly without conversion).

The receiver is preferably coupled to the communications link by a duplexer-coupled RF antenna, but may additionally or alternatively be coupled to the communications link in any suitable manner. Some examples of alternative couplings include coupling via one or more dedicated receive antennas. In another alternative coupling, the receiver may be coupled to the communications link by a circulator-coupled RF antenna.

The receiver preferably includes an ADC 1050 (described in following sections) and converts baseband analog signals to digital signals. The receiver may additionally or alternatively include an integrated amplifier 1020 and/or a frequency downconverter 1040 (enabling the receiver to convert RF or other analog signals to digital).

The system 1000 is preferably coupled to or integrated with a transmitter that functions to transmit signals of the communications system over a communications link to a second communications system. The transmitter preferably converts digital transmit signals into analog transmit signals.

The transmitter is preferably coupled to the communications link by a duplexer-coupled RF antenna, but may additionally or alternatively be coupled to the communications link in any suitable manner. Some examples of alternative couplings include coupling via one or more dedicated transmit antennas, dual-purpose transmit and/or receive antennas, or any other suitable antennas. In other alternative couplings, the transmitter may be coupled to the communications link by direct wired coupling (e.g., through one or more RF coaxial cables, transmission line couplers, etc.).

The transmitter preferably includes a DAC 1060 (described in following sections) and converts digital signals to baseband analog signals. The transmitter may additionally or alternatively include an integrated amplifier 1020 and/or a frequency upconverter 1030 (enabling the transmitter to convert digital signals to RF signals and/or intermediate frequency (IF) signals).

The transmitter and receiver may be coupled to the same communicating device or different communicating devices. In some variations, there may be multiple transmitters and/or receivers, which may be coupled to the same or different communication devices in any suitable combination.

Signal couplers 1010 function to allow analog signals to be split and/or combined. While not necessarily shown in the figures, signal couplers are preferably used at each junction (e.g., splitting, combining) of two or more analog signals; alternatively, analog signals may be coupled, joined, or split in any manner. In particular, signal couplers 1010 may be used to provide samples of transmit signals, as well as to combine interference cancellation signals with other signals (e.g., transmit or receive signals). Alternatively, signal couplers 1010 may be used for any purpose. Signal couplers 1010 may couple and/or split signals using varying amounts of power; for example, a signal coupler 1010 intended to sample a signal may have an input port, an output port, and a sample port, and the coupler 1010 may route the majority of power from the input port to the output port with a small amount going to the sample port (e.g., a 99.9%/0.1% power split between the output and sample port, or any other suitable split).

The signal coupler 1010 is preferably a short section directional transmission line coupler, but may additionally or alternatively be any power divider, power combiner, directional coupler, or other type of signal splitter. The signal coupler 130 is preferably a passive coupler, but may additionally or alternatively be an active coupler (for instance, including power amplifiers). For example, the signal coupler 1010 may comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive tee, and/or a resistive bridge hybrid coupler. The output ports of the signal coupler 1010 are preferably phase-shifted by ninety degrees, but may additionally or alternatively be in phase or phase shifted by a different amount.

Amplifiers 1020 function to amplify signals of the system 1000. Amplifiers may include any analog or digital amplifiers. Some examples of amplifiers 1020 include low-noise amplifiers (LNA) typically used to amplify receive signals and power amplifiers (PA) typically used to amplify transmit signals prior to transmission.

Frequency upconverters 1030 function to upconvert a carrier frequency of an analog signal (typically from baseband to RF, but alternatively from any frequency to any other higher frequency). Upconverters 1030 preferably accomplish signal upconversion using heterodyning methods, but may additionally or alternatively use any suitable upconversion methods.

The upconverter 1030 preferably includes a local oscillator (LO), a mixer, and a bandpass filter. The local oscillator functions to provide a frequency shift signal to the mixer; the mixer combines the frequency shift signal and the input signal to create (usually two, but alternatively any number) frequency shifted signals, one of which is the desired output signal, and the bandpass filter rejects signals other than the desired output signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog integrated circuits (ICs), digital ICs, and/or any other suitable components. The mixer preferably functions to combine two or more electrical input signals into one or more composite outputs, where each output includes some characteristics of at least two input signals.

The bandpass filter is preferably a tunable bandpass filter centered around an adjustable radio frequency. Additionally or alternatively, the bandpass filter may be a bandpass filter centered around a set radio frequency, or any other suitable type of filter. The bandpass filter is preferably a passive filter, but may additionally or alternatively be an active filter. The bandpass filter is preferably implemented with analog circuit components, but may additionally or alternatively be digitally implemented.

In variations in which the bandpass filter is tunable, the center frequency of each tunable filter is preferably controlled by a control circuit or tuning circuit, but may additionally or alternatively be controlled by any suitable system (including manually controlled, e.g. as in a mechanically tuned capacitor). Each tunable bandpass filter preferably has a set quality (Q) factor, but may additionally or alternatively have a variable Q factor. The tunable bandpass filters may have different Q factors; for example, some of the tunable filters may be high-Q, some may be low-Q, and some may be no-Q (flat response).

Frequency downconverters 1040 function to downconvert the carrier frequency of an analog signal (typically to baseband, but alternatively to any frequency lower than the carrier frequency). The downconverter 1040 preferably accomplishes signal downconversion using heterodyning methods, but may additionally or alternatively use any suitable downconversion methods.

The downconverter 1040 preferably includes a local oscillator (LO), a mixer, and a baseband filter. The local oscillator functions to provide a frequency shift signal to the mixer; the mixer combines the frequency shift signal and the input signal to create (usually two) frequency shifted signals, one of which is the desired signal, and the baseband filter rejects signals other than the desired signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The baseband filter is preferably a lowpass filter with a tunable low-pass frequency. Additionally or alternatively, the baseband filter may be a lowpass filter with a set low-pass frequency, a bandpass filter, or any other suitable type of filter. The baseband filter is preferably a passive filter, but may additionally or alternatively be an active filter.

The baseband filter is preferably implemented with analog circuit components, but may additionally or alternatively be digitally implemented.

While the bandpass filter of the frequency upconverter 1030 and the baseband filter of the frequency downconverter 1040 are necessary for performing frequency upconversion and downconversion, they also may be useful for filtering transmit and/or receive band signals. This is discussed in more detail in the sections on filtering and cancellation systems 1100, 1200, 1300, and 1400, but in general, the same filters that reject image frequencies generated by mixers may also reject signals outside of a desired band of interest.

For example, an RF receive signal may contain one or more signal components in a receive band (at 5690 MHz) and interference due to an undesired signal in a nearby transmit band (at 5670 MHz). When these signals are downconverted to baseband by a receiver (or other downconverter with an LO at the receive band frequency), they are first processed by the mixer, which generates four signals:

5690 MHz±5690 MHz and 5690 MHz±5670 MHz

0 MHz, 20 MHz, 11.38 GHz, 11.36 GHz

The 11 GHz frequencies are easily filtered by the filter of the downconverter, but the filter may additionally be used to filter out that 20 MHz signal as well (reducing transmit band presence in the baseband receive signal). In this way, frequency downconversion can be used to assist other filtering or interference cancellation systems of the system 1000.

Note that while the upconverter 1040 also performs filtering, and that filtering may be used to filter out undesired signals, filtering during upconversion may be less effective than filtering during downconversion. One reason for this is architecture-based; power amplification is typically performed after upconversion (and power amplification may amount for a large part of interference generation in other bands). That being said, it may still be useful to filter a signal prior to amplification, and noisy amplification is not always performed for all upconverted signals (e.g., digital transmit signal samples converted to RF). Another reason is that the upconverter bandpass frequency is centered around the RF frequency (or other frequency higher than baseband), which means that for a given amount of cancellation required, the filter must have a higher quality factor (Q).

For example, if a filter is desired to reject 30 dB at 20 MHz away from an RF center frequency of 5 GHz (that is, after upconversion or before downconversion), the Q of that filter must be higher than a low-pass filter desired to rejected 30 dB at 20 MHz away from baseband.

Analog-to-digital converters (ADCs) 1050 function to convert analog signals (typically at baseband, but additionally or alternatively at any frequency) to digital signals. ADCs 1050 may be any suitable analog-to-digital converter; e.g., a direct-conversion ADC, a flash ADC, a successive-approximation ADC, a ramp-compare ADC, a Wilkinson ADC, an integrating ADC, a delta-encoded ADC, a time-interleaved ADC, or any other suitable type of ADC.

Digital-to-analog converters (DACs) 1060 function to convert digital signals to analog signals (typically at baseband, but additionally or alternatively at any frequency). The DAC 1060 may be any suitable digital-to-analog converter; e.g., a pulse-width modulator, an oversampling DAC, a binary-weighted DAC, an R-2R ladder DAC, a cyclic DAC, a thermometer-coded DAC, or a hybrid DAC.

Time delays 1070 function to delay signal components. Delays 1070 may be implemented in analog (e.g., as a time delay circuit) or in digital (e.g., as a time delay function). Delays 1070 may be fixed, but may additionally or alternatively introduce variable delays. The delay 1070 is preferably implemented as an analog delay circuit (e.g., a bucket-brigade device, a long transmission line, a series of RC networks) but may additionally or alternatively be implemented in any other suitable manner. If the delay 1070 is a variable delay, the delay introduced may be set by a tuning circuit or other controller of the system 1000. Although not necessarily explicitly shown in figures, delays 1070 may be coupled to the system 1000 in a variety of ways to delay one signal relative to another. For example, delays 1070 may be used to delay a receive or transmit signal to account for time taken to generate an interference cancellation signal (so that the two signals may be combined with the same relative timing). Delays 1070 may potentially be implemented as part of or between any two components of the system 1000.

The TxICS 1100 functions to mitigate interference present in the transmit band of a signal using self-interference cancellation techniques; that is, generating a self-interference cancellation signal by transforming signal samples of a first signal (typically a transmit signal) into a representation of self-interference present in another signal (e.g., a receive signal, a transmit signal after amplification, etc.), due to transmission of the first signal and then subtracting that interference cancellation signal from the other signal.

The TxICS 1100 is preferably used to cancel interference present in the transmit band of a receive signal; i.e., the TxICS 1100 generates an interference cancellation signal from samples of a transmit signal using a circuit that models the representation of the transmit signal, in the transmit band, as received by a receiver, and subtracts that cancellation signal from the receive signal.

The TxICS 1100 may additionally be used to cancel interference present in the transmit band (TxB) of a transmit signal sample; i.e., the TxICS 1100 generates an interference cancellation signal from samples of a transmit signal using a circuit that models the representation of the transmit signal, in the transmit band, as generated by a transmitter (generally, but not necessarily, before transmission at an antenna), and subtracts that cancellation signal from the transmit signal sample. This type of interference cancellation is generally used to 'clean' a transmit signal sample; that is, to remove transmit band signal of a transmit sample, so that the sample contains primarily information in the receive band (allowing the sample to be used to perform receive-band interference cancellation, typically using the RxICS 1300).

The TxICS 1100 comprises at least one of a digital TX interference canceller (TxDC) 1110 and an analog TX interference canceller (TxAC) 1120. In the case that the TxICS 1100 performs both receive signal cancellation and transmit sample cancellation, the TxICS 1100 may include separate cancellers to perform these tasks; additionally or alternatively, the TxICS 1100 may include any number of cancellers for any purpose (e.g., one canceller performs both tasks, many cancellers perform a single task, etc.).

The TxDC 1110 functions to produce a digital interference cancellation signal from a digital input signal according to a digital transform configuration. The TxDC 1110 may be used to cancel interference in any signal, using any input, but the TxDC 1110 is preferably used to cancel transmit band interference in an analog receive signal (by converting a digital interference cancellation signal to analog using a DAC 1006 and combining it with the analog receive signal). The TxDC 1110 may also be used to cancel transmit band signal components in a transmit signal (to perform transmit signal cleaning as previously described).

Using upconverters 1030, downconverters 1040, ADCs 1050, and DACs 1006, the TxDC 1110 may convert analog signals of any frequency to digital input signals, and may additionally convert interference cancellation signals from digital to analog signals of any frequency.

The digital transform configuration of the TxDC 1110 includes settings that dictate how the TxDC 1110 transforms a digital transmit signal to a digital interference signal (e.g. coefficients of a generalized memory polynomial used to transform a transmit signal to an interference cancellation signal). The transform configuration for a TxDC 1110 is preferably set adaptively by a transform adaptor, but may additionally or alternatively be set by any component of the system 1000 (e.g., a tuning circuit) or fixed in a set transform configuration.

The TxDC 1110 is preferably substantially similar to the digital self-interference canceller of U.S. Provisional Application No. 62/268,388, the entirety of which is incorporated by this reference, except in that the TxDC 1110 is not necessarily applied solely to cancellation of interference in a receive signal resulting from transmission of another signal (as previously described).

Figure 9:
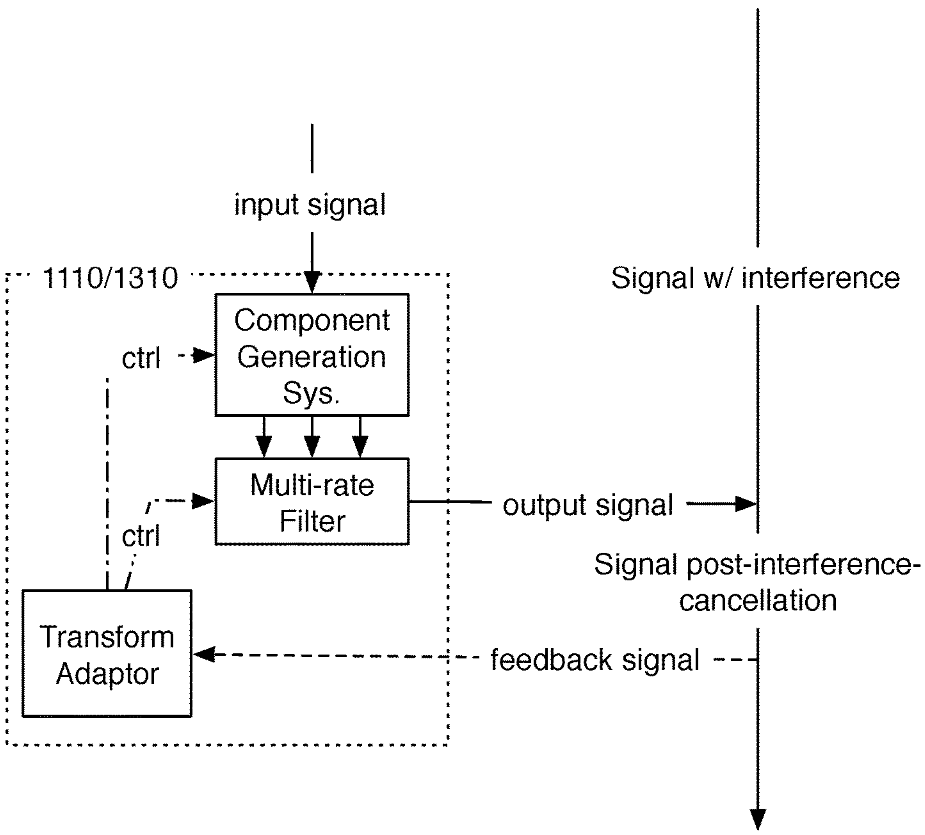
FIG. 9 is a diagram representation of a digital interference canceller of a system of a preferred embodiment.

In one implementation of a preferred embodiment, the TxDC 1110 includes a component generation system, a multi-rate filter, and a transform adaptor, as shown in FIG. 9.

The component generation system functions to generate a set of signal components from the sampled input signal (or signals) that may be used by the multi-rate filter to generate an interference cancellation signal. The component generation system preferably generates a set of signal components intended to be used with a specific mathematical model (e.g., generalized memory polynomial (GMP) models, Volterra models, and Wiener-Hammerstein models); additionally or alternatively, the component generation system may generate a set of signal components usable with multiple mathematical models.

In some cases, the component generator may simply pass a copy of a sampled transmit signal unmodified; this may be considered functionally equivalent to a component generator not being explicitly included for that particular path.

The multi-rate adaptive filter functions to generate an interference cancellation signal from the signal components produced by the component generation system. In some implementations, the multi-rate adaptive filter may additionally function to perform sampling rate conversions (similarly to an upconverter 1030 or downconverter 1040, but applied to digital signals). The multi-rate adaptive filter preferably generates an interference cancellation signal by combining a weighted sum of signal components according to mathematical models adapted to model interference contributions of the transmitter, receiver, channel and/or other sources. Examples of mathematical models that may be used by the multi-rate adaptive filter include generalized memory polynomial (GMP) models, Volterra models, and Wiener-Hammerstein models; the multi-rate adaptive filter may additionally or alternatively use any combination or set of models.

The transform adaptor functions to set the transform configuration of the multi-rate adaptive filter and/or the component generation system. The transform configuration preferably includes the type of model or models used by the multi-rate adaptive filter as well as configuration details pertaining to the models (each individual model is a model type paired with a particular set of configuration details). For example, one transform configuration might set the multi-rate adaptive filter to use a GMP model with a particular set of coefficients. If the model type is static, the transform configuration may simply include model configuration details; for example, if the model is always a GMP model, the transform configuration may include only coefficients for the model, and not data designating the model type.

The transform configuration may additionally or alternatively include other configuration details related to the signal component generation system and/or the multi-rate adaptive filter. For example, if the signal component generation system includes multiple transform paths, the transform adaptor may set the number of these transform paths, which model order their respective component generators correspond to, the type of filtering used, and/or any other suitable details. In general, the transform configuration may include any details relating to the computation or structure of the signal component generation system and/or the multi-rate adaptive filter.

The transform adaptor preferably sets the transform configuration based on a feedback signal sampled from a signal post-interference-cancellation (i.e., a residue signal). For example, the transform adaptor may set the transform configuration iteratively to reduce interference present in a residue signal. The transform adaptor may adapt transform configurations and/or transform-configuration-generating algorithms using analytical methods, online gradient-descent methods (e.g., LMS, RLMS), and/or any other suitable methods. Adapting transform configurations preferably includes changing transform configurations based on learning. In the case of a neural-network model, this might include altering the structure and/or weights of a neural network based on test inputs. In the case of a GMP polynomial model, this might include optimizing GMP polynomial coefficients according to a gradient-descent method.

Note that TxDC 1110 may share transform adaptors and/or other components (although each TxDC 1110 is preferably associated with its own transform configuration).

The TxAC 1120 functions to produce an analog interference cancellation signal from an analog input signal. The TxAC 1120 may be used to cancel interference in any signal, using any input, but the TxAC 1120 is preferably used to cancel transmit band interference in an analog receive signal. The TxAC 1120 may also be used to cancel transmit band signal components in a transmit signal sample (to perform transmit signal cleaning as previously described).

Using upconverters 1030, downconverters 1040, ADCs 1050, and DACs 1060, the TxAC 1120 may convert digital signals to analog input signals, and may additionally convert interference cancellation signals from analog to digital (or to another analog signal of different frequency).

The TxAC 1120 is preferably designed to operate at a single frequency band, but may additionally or alternatively be designed to operate at multiple frequency bands. The TxAC 1120 is preferably substantially similar to the circuits related to analog self-interference cancellation of U.S. patent application Ser. No. 14/569,354 (the entirety of which is incorporated by this reference); e.g., the RF self-interference canceller, the IF self-interference canceller, associated up/downconverters, and/or tuning circuits, except that the TxAC 1120 is not necessarily applied solely to cancellation of interference in a receive signal resulting from transmission of another signal (as previously described).

The TxAC 1120 is preferably implemented as an analog circuit that transforms an analog input signal into an analog interference cancellation signal by combining a set of filtered, scaled, and/or delayed versions of the analog input signal, but may additionally or alternatively be implemented as any suitable circuit. For instance, the TxAC 1120 may perform a transformation involving only a single version, copy, or sampled form of the analog input signal. The transformed signal (the analog interference cancellation signal) preferably represents at least a part of an interference component in another signal.

The TxAC 1120 is preferably adaptable to changing self-interference parameters in addition to changes in the input signal; for example, transceiver temperature, ambient temperature, antenna configuration, humidity, and transmitter power. Adaptation of the TxAC 1120 is preferably performed by a tuning circuit, but may additionally or alternatively be performed by a control circuit or other control mechanism included in the canceller or any other suitable controller (e.g., by the transform adaptor of the TxDC 1110).

Figure 10:
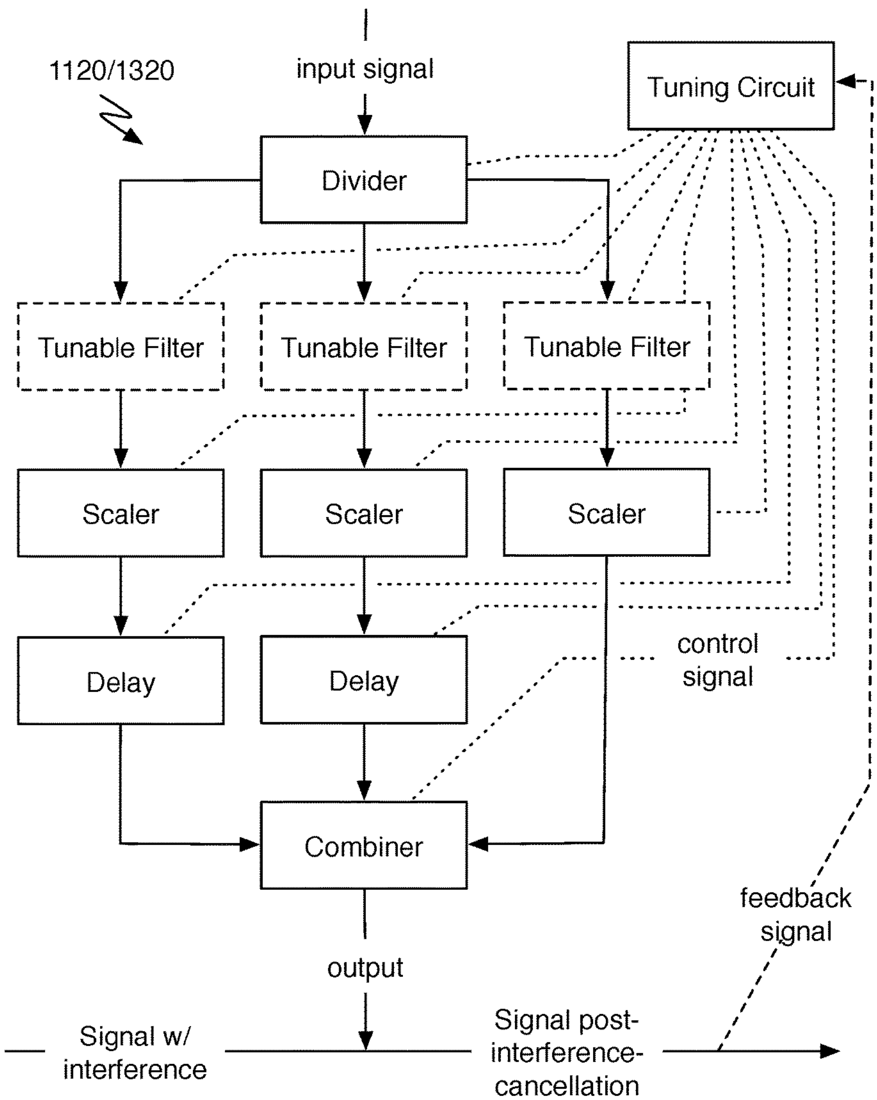
FIG. 10 is a diagram representation of an analog interference canceller of a system of a preferred embodiment.

In one implementation of a preferred embodiment, the TxAC 1120 includes a set of scalers (which may perform gain, attenuation, or phase adjustment), a set of delays, a signal combiner, a signal divider, and a tuning circuit, as shown in FIG. 10. In this implementation the TxAC 1120 may optionally include tunable filters (e.g., bandpass filters including an adjustable center frequency, lowpass filters including an adjustable cutoff frequency, etc.).

The tuning circuit preferably adapts the TxAC 1120 configuration (e.g., parameters of the filters, scalers, delayers, signal divider, and/or signal combiner, etc.) based on a feedback signal sampled from a signal after interference cancellation is performed (i.e., a residue signal). For example, the tuning circuit may set the TxAC 1120 configuration iteratively to reduce interference present in a residue signal. The tuning circuit preferably adapts configuration parameters using online gradient-descent methods (e.g., LMS, RLMS), but configuration parameters may additionally or alternatively be adapted using any suitable algorithm. Adapting configuration parameters may additionally or alternatively include alternating between a set of configurations. Note that TxACs may share tuning circuits and/or other components (although each TxAC 1120 is preferably associated with a unique configuration or architecture). The tuning circuit may be implemented digitally and/or as an analog circuit.

Figure 11:
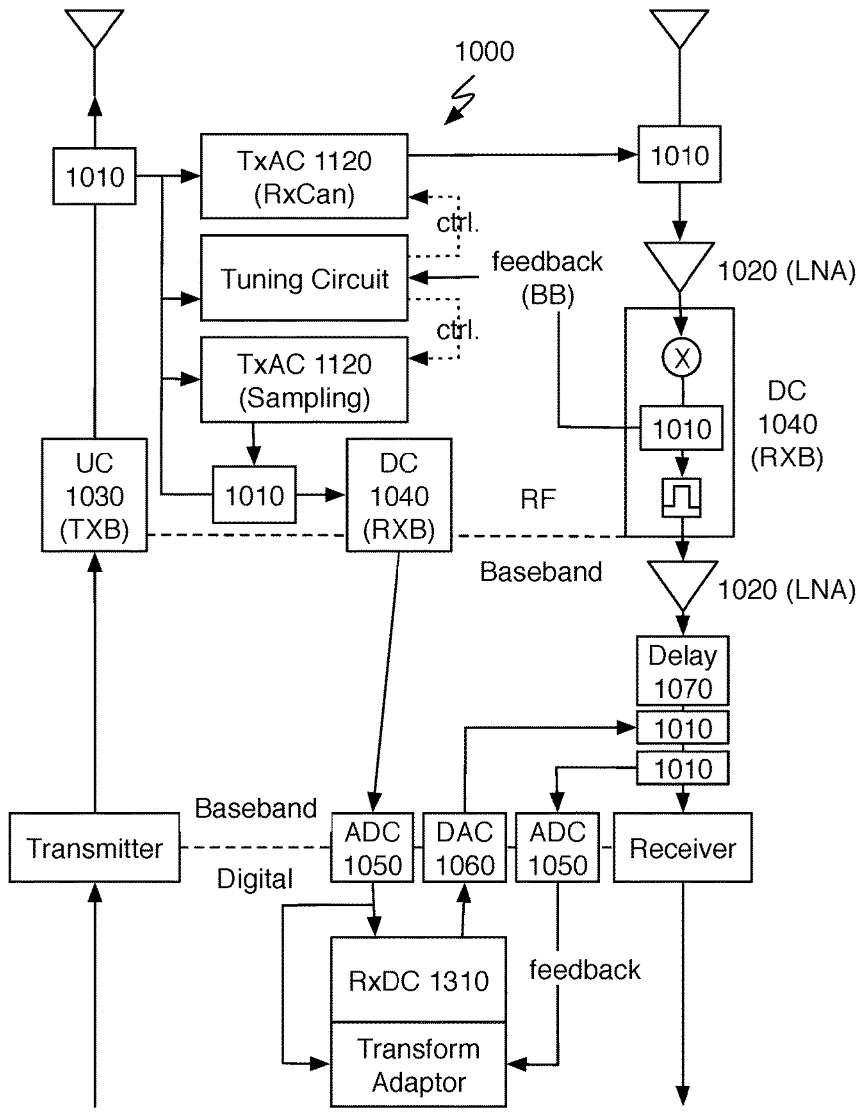
FIG. 11 is a diagram representation of a system of a preferred embodiment.

In one implementation of a preferred embodiment, the TxICS 1100 performs interference cancellation solely using analog cancellation, as shown in FIG. 11. In this implementation, the TxICS 1100 includes a TxAC 1120 (RxCan) used to cancel transmit band signal components present in the receive signal as well as a TxAC 1120 used to clean transmit signal samples (as previously described) for use by an RxICS 1300; both cancellers are controlled by a single tuning circuit, which receives input from both the transmit signal and from the residue signal. Note that as shown in FIG. 11, the tuning circuit takes a baseband feedback signal from the downconverter 1040 after mixing, but prior to final filtering. While it would also be possible for the tuning circuit to receive an RF feedback signal from before the downconverter 1040, note that in this implementation the filter of the downconverter 1040 may be used to remove transmit band signal components remaining after cancellation. Because the presence of these signal components prior to filtering is an indication of the performance of the RxCan TxAC 1120, it may be preferred for the tuning circuit to sample a residue signal prior to filtering that removes transmit band signal components. Alternatively, the tuning circuit may sample any signals at any point.

Figure 12:
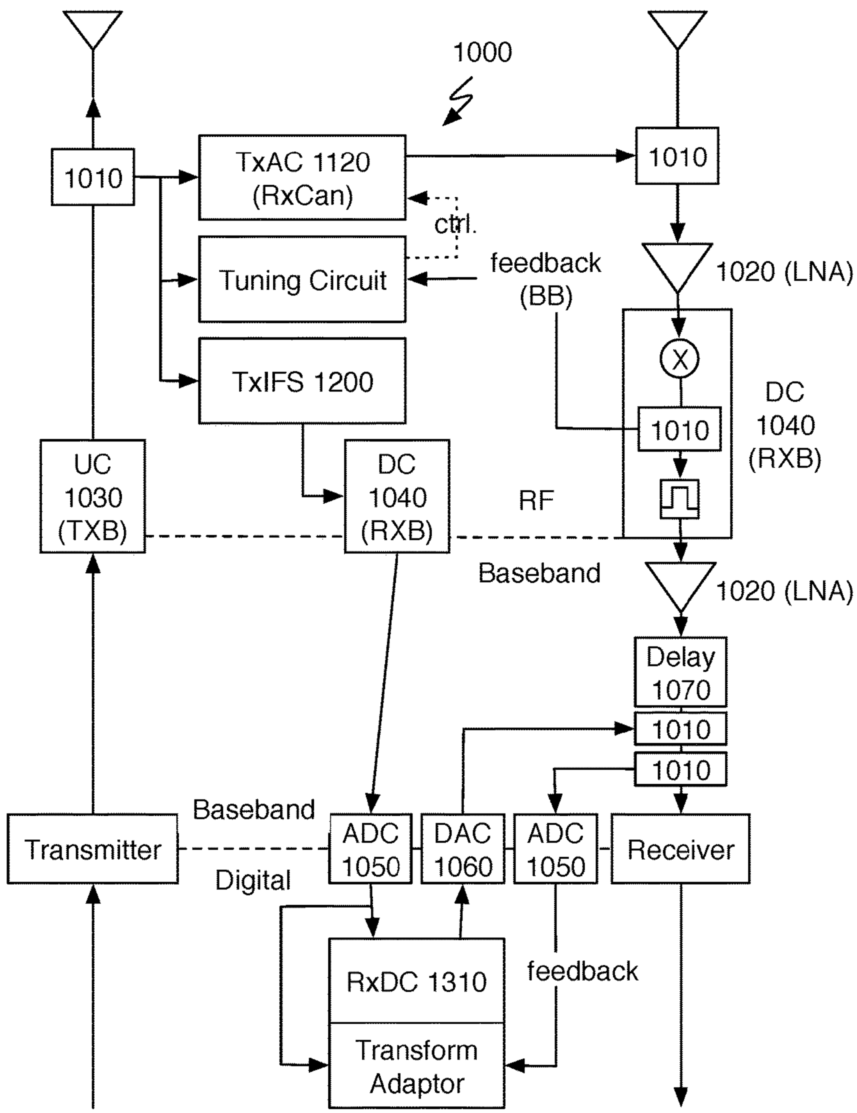
FIG. 12 is a diagram representation of a system of a preferred embodiment.

In a variation of this implementation, the system may utilize a combination of transmit band filtering (using TxIFS 1200) and cancellation, as shown in FIG. 12.

Figure 13:
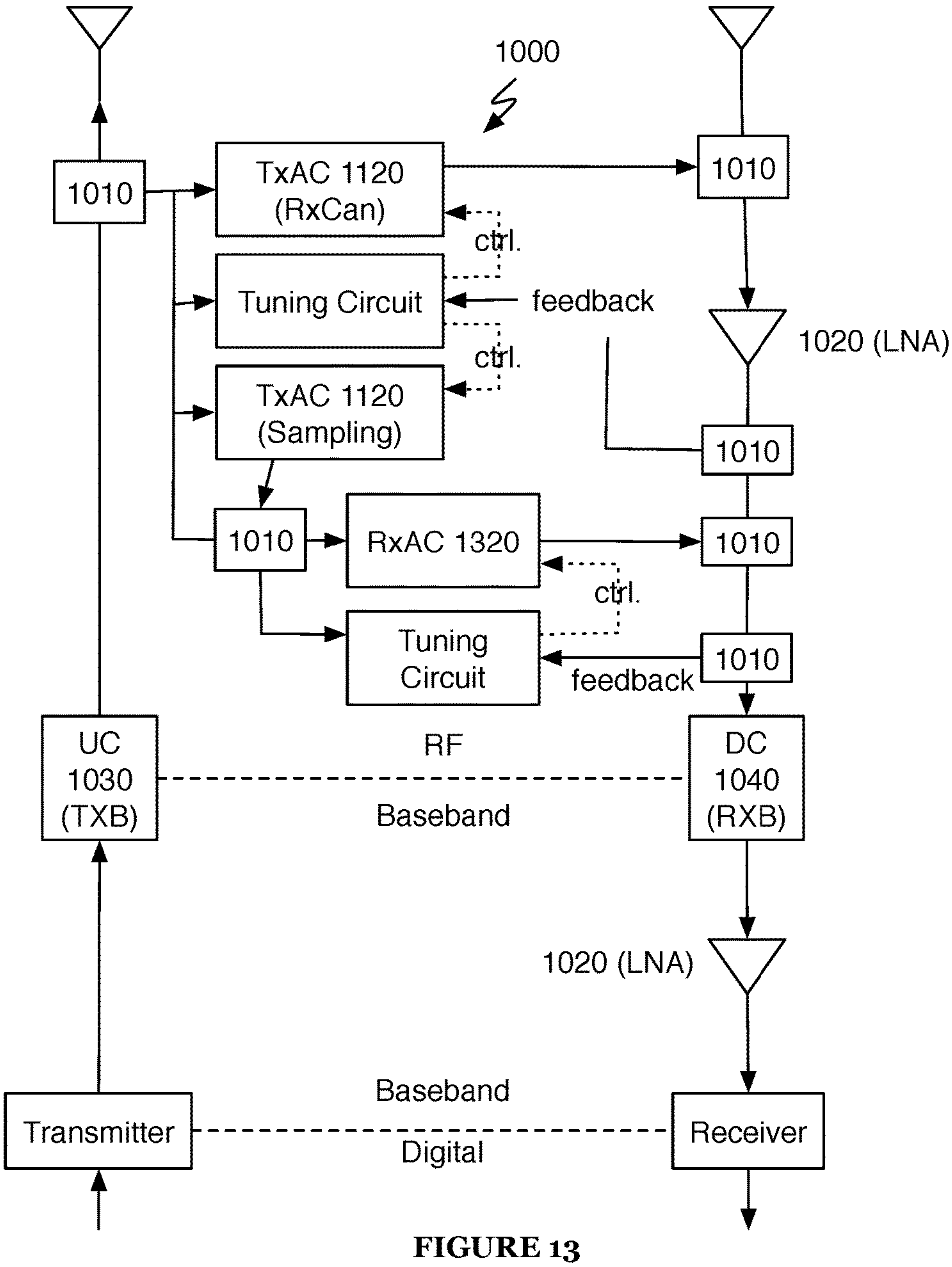
FIG. 13 is a diagram representation of a system of a preferred embodiment.
Figure 14:
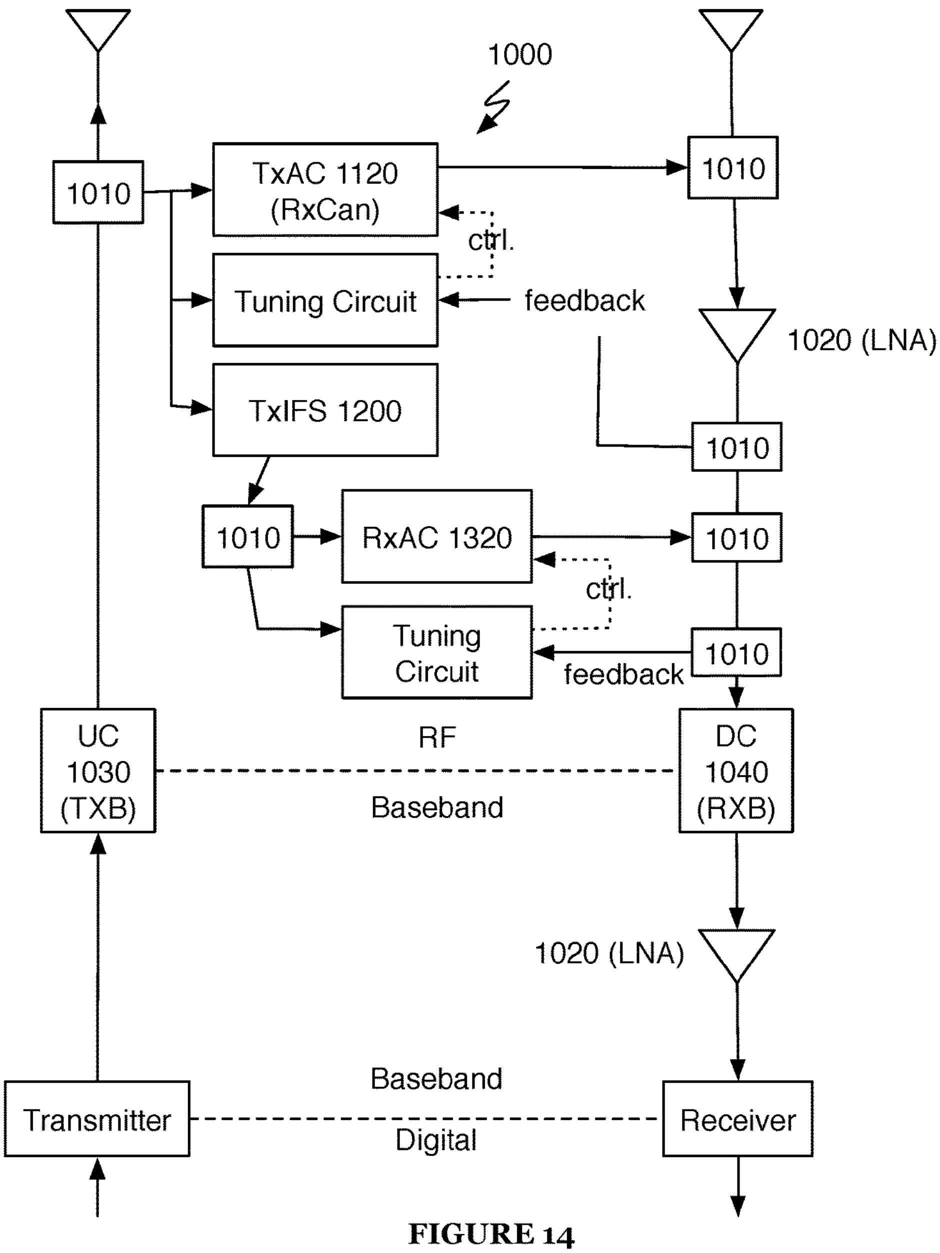
FIG. 14 is a diagram representation of a system of a preferred embodiment.

As shown in FIGS. 11 and 12, the RxICS 1300 (including an RxDC 1310 and associated components) is implemented digitally, but may additionally or alternatively be implemented in analog (including an RxAC 1320 and associated components), as shown in FIGS. 13 and 14. The TxICS 1100 and/or RxICS 1300 may be implemented in digital domains, analog domains, or a combination of the two.

Figure 15:
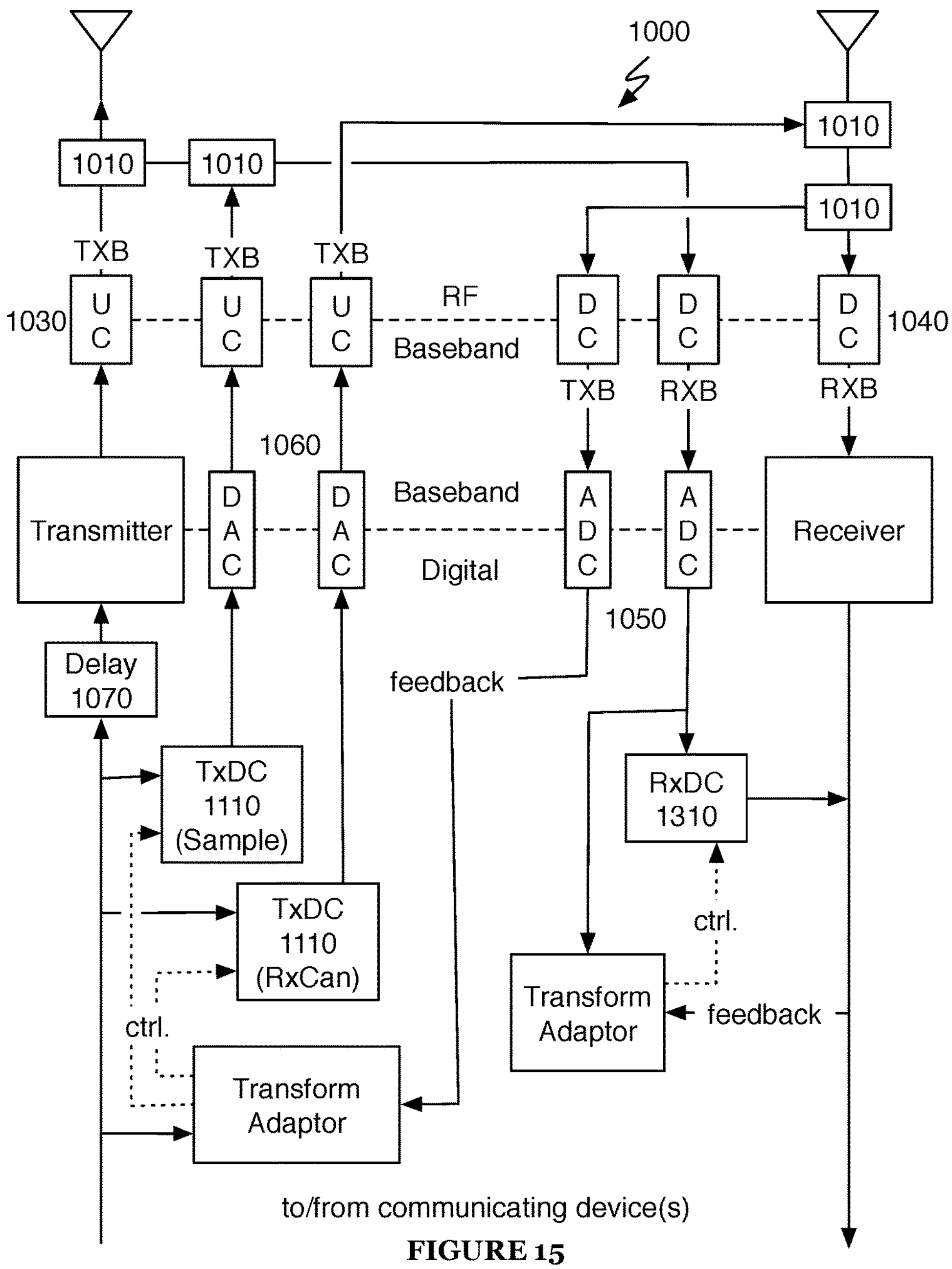
FIG. 15 is a diagram representation of a system of a preferred embodiment.

In one implementation of a preferred embodiment, the TxICS 1100 performs interference cancellation solely using digital cancellation, as shown in FIG. 15. In this implementation, the TxICS 1100 includes a TxDC 1110 (RxCan) used to cancel transmit band signal components present in the receive signal as well as a TxDC 1110 (Sample) used to clean transmit signal samples for use by an RxICS 1300; both cancellers are controlled by a single transform adaptor, which receives input from both the transmit signal and from the residue signal. Note that in this implementation, the RxDC 1310 receives an input signal derived from a combination of the upconverted output of the Sample TxDC 1110 with the upconverted transmit signal, but additionally or alternatively the RxDC 1310 may receive an input signal directly from the digital transmit path. As shown in FIGS. 11 and 12, the RxICS 1300 is implemented digitally, but may additionally or alternatively be implemented in analog, as shown in FIGS. 13 and 14. The TxICS 1100 and/or RxICS 1300 may be implemented in digital domains, analog domains, or a combination of the two.

Note that while as shown in these FIGURES, the TxCan and Sample cancellers sample the transmit signal on parallel paths, multiple cancellers of the TxICS 1100 may share switched signal paths (e.g., the coupler 1010 coupled to the transmit antenna in FIG. 11 may switch between the RxCan TxAC 1120 and the Sampling TxAC 1120).

The TxIFS 1200 functions to mitigate interference present in the transmit band of a signal by performing filtering in the transmit band. The TxIFS 1200 is preferably used to filter out interference present in the transmit band of a receive signal; e.g., the TxIFS 1200 includes a filter on the receive signal that allows signal components in the receive band to pass while blocking signal components in the transmit band.

The TxIFS 1200 may additionally or alternatively be used to filter out interference present in the transmit band of a transmit signal sample; e.g., to generate a transmit signal sample that includes primarily signal components in the receive band (as a way to estimate interference generated in the receive band of the receive signal by the transmit signal). Transmit samples cleaned in this way may be used to perform receive-band interference cancellation, typically using the RxICS 1300.

The TxIFS 1200 preferably includes one or more tunable bandpass filters. Alternatively, the TxIFS 1200 may include any type of filter. For example, the TxIFS 1200 may include a notch filter to remove transmit band signal components only. Filters of the TxIFS 1200 are preferably used for RF signals, but may additionally or alternatively be used for any frequency analog signal.

Filters of the TxIFS 1200 preferably transform signal components according to the response of the filter, which may introduce a change in signal magnitude, signal phase, and/or signal delay. Filters of the TxIFS 1200 are preferably formed from a combination (e.g., in series and/or in parallel) of resonant elements. Resonant elements of the filters are preferably formed by lumped elements, but may additionally or alternatively be distributed element resonators, ceramic resonators, SAW resonators, crystal resonators, cavity resonators, or any suitable resonators.

Filters of the TxIFS 1200 are preferably tunable such that one or more peaks of the filters may be shifted. In one implementation of a preferred embodiment, one or more resonant elements of a filter may include a variable shunt capacitance (e.g., a varactor or a digitally tunable capacitor) that enables filter peaks to be shifted. Additionally or alternatively, filters may be tunable by quality factor (i.e., Q may be modified by altering circuit control values), or filters may be not tunable. Filters 145 may include, in addition to resonant elements, delayers, phase shifters, and/or scaling elements. The filters are preferably passive filters, but may additionally or alternatively be active filters. The filters are preferably implemented with analog circuit components, but may additionally or alternatively be digitally implemented. The center frequency of any tunable peak of a filter is preferably controlled by a tuning circuit, but may additionally or alternatively be controlled by any suitable system (including manually controlled, e.g. as in a mechanically tuned capacitor).

In some implementations, the system can include both a TxIFS 1200 and a TxICS 1100 that are cooperatively operated. For example, the TxIFS 1200 may include a filter with a tunable quality factor, and TxICS 1100 operation may be tuned based on the quality factor of the filter (e.g., selection of a lower quality factor may cause the TxICS 1100 to be adaptively configured to reduce interference over a wider range of signal components). In another example, the TxIFS 1200 and TxICS 1100 may be each be switched in and out of the receive and transmit path, respectively (e.g., the TxIFS is switched into the receive path when the TxICS is switched out of the transmit path, and vice versa). The TxIFS 1200 and/or TxICS 1100 may additionally or alternatively be configured in any suitable manner.

The RxICS 1300 functions to mitigate interference present in the receive band of a signal using self-interference cancellation techniques; that is, generating a self-interference cancellation signal by transforming signal samples of a first signal (typically a transmit signal) into a representation of self-interference present in another signal, due to transmission of the first signal (e.g., a receive signal, a transmit signal after amplification, etc.) and then subtracting that interference cancellation signal from the other signal.

The RxICS 1300 is preferably used to cancel interference present in the receive band of a receive signal; i.e., the RxICs 1300 generates an interference cancellation signal from samples of receive band components of a transmit signal using a circuit that models the representation of the transmit signal, in the receive band, as received by a receiver, and subtracts that cancellation signal from the receive signal.

The RxICS 1300 preferably receives as input samples of a transmit signal that has been filtered (e.g., by the TxIFS 1200) or interference cancelled (e.g., by the TxICS 1100) to reduce the presence of transmit band components (allowing for better estimation of interference due to signal components of the transmit signal that are in the receive band).

The RxICS 1300 preferably cancels interference on a receive signal that has already experienced transmit band cancellation and/or filtering, but additionally or alternatively, the RxICS 1300 may cancel interference on a receive signal that has not experienced transmit band cancellation or filtering.

The RxICS 1300 comprises at least one of a digital RX interference canceller (RxDC) 1310 and an analog RX interference canceller (RxAC) 1320.

The RxDC 1310 is preferably substantially similar to the TxDC 1110, but may additionally or alternatively be any suitable digital interference canceller.

The RxAC 1320 is preferably substantially similar to the TxAC 1120, but may additionally or alternatively be any suitable analog interference canceller.

The RxIFS 1400 functions to mitigate interference present in the receive band of a transmit signal by performing filtering in the receive band. The RxIFS 1400, if present, functions to remove receive-band signal components in a transmit signal prior to transmission (but preferably post-power-amplification). Filters of the RxIFS 1400 are preferably substantially similar to those of the TxIFS 1200, but the RxIFS may additionally or alternatively include any suitable filters.

In some implementations, the system can include both an RxIFS 1400 and an RxICS 1300 that are cooperatively operated. For example, the RxIFS 1400 may include a filter with a tunable quality factor, and RxICS 1300 operation may be tuned based on the quality factor of the filter (e.g., selection of a lower quality factor may cause the RxICS 1300 to be adaptively configured to reduce interference over a wider range of signal components). In another example, the RxIFS 1400 and RxICS 1300 may be each be switched in and out of the transmit and receive path, respectively (e.g., the RxIFS is switched into the transmit path when the RxICS is switched out of the receive path, and vice versa). The RxIFS 1400 and/or RxICS 1300 may additionally or alternatively be configured in any suitable manner.

In some implementations, the system can include a TxICS 1100, TxIFS 1200, RxICS 1300, and RxIFS 1400. Each of the TxICS, TxIFS, RxICS, and RxIFS may be controlled based on the performance and/or operation of any of the other subsystems, or alternatively based on any suitable conditions. For example, the TxIFS 1200 may include a filter with an adjustable Q-factor, and the RxICS 1300 may include a transform adaptor that is controlled according to the Q-factor of the filter of the TxIFS 1200 (e.g., adjusting the filter to a high Q-factor corresponds to a transform configuration that removes signal components in a narrow frequency band corresponding to the pass band of the filter).

The methods of the preferred embodiment and variations thereof can be embodied and/or implemented at least in part as a machine configured to receive a computer-readable medium storing computer-readable instructions. The instructions are preferably executed by computer-executable components preferably integrated with a system for wireless communication. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for out-of-band interference mitigation comprising:

a transmit digital canceller, communicatively coupled to a digital transmit signal of a communication system, that samples and then transforms the digital transmit signal to create a first digital interference cancellation signal; wherein the transmit digital canceller transforms the digital transmit signal according to a first configuration state; wherein the digital transmit signal is ultimately upconverted by the communication system to a radio frequency (RF) transmit signal having a first RF carrier frequency in a transmit band;

a first digital-to-analog-converter (DAC) that converts the first digital interference cancellation signal to a first baseband (BB) interference cancellation signal;

a first frequency upconverter that converts the first BB interference cancellation signal to a first RF interference cancellation signal having the first RF carrier frequency in the transmit band;

a first receive coupler, communicatively coupled to an RF receive signal of the communication system having a second RF carrier frequency in a receive band, that combines, in order to remove a first portion of interference in the transmit band, the first RF interference cancellation signal and the RF receive signal to generate a composite RF receive signal; wherein the composite RF receive signal is ultimately downconverted by the communication system to a composite digital receive signal;

a sampling digital canceller, communicatively coupled to the digital transmit signal of the communication system, that samples and then transforms the digital transmit signal to create a second digital interference cancellation signal; wherein the sampling digital canceller transforms the digital transmit signal according to a second configuration state;

a second DAC that converts the second digital interference cancellation signal to a second BB interference cancellation signal;

a second frequency upconverter that converts the second BB interference cancellation signal to a second RF interference cancellation signal having the first RF carrier frequency in the transmit band;

a cleaning coupler that combines, in order to remove interference in the transmit band, the RF transmit signal and the second RF interference cancellation signal to generate a cleaned RF transmit signal;

a first frequency downconverter that converts the cleaned RF transmit signal to a cleaned BB transmit signal;

a first analog-to-digital-converter (ADC) that converts the cleaned BB transmit signal to a cleaned digital transmit signal;

a receive-band digital canceller that converts the cleaned digital transmit signal to a third digital interference cancellation signal; wherein the receive-band digital canceller transforms the cleaned digital transmit signal according to a third configuration state; wherein the third digital interference cancellation signal is combined with the composite digital receive signal in order to remove a second portion of interference in the receive band.

2. The system of claim 1, further comprising a first transform adaptor that receives the composite RF receive signal from the receive path; wherein the first transform adaptor sets the first and second configuration states based on changes in the composite RF receive signal.

3. The system of claim 2, wherein the composite RF receive signal is converted to a digital signal prior to reception by the transform adaptor.

4. The system of claim 3, further comprising a second transform adaptor that samples the composite digital receive signal after combination with the third digital interference cancellation signal; wherein the second transform adaptor sets the third configuration state based on changes in the composite digital receive signal.

5. The system of claim 1, wherein the transmit band and the receive band are non-overlapping.

6. The system of claim 1, wherein the transmit digital canceller comprises: a first signal component generation system, coupled to the digital transmit signal, that generates a first set of signal components from the digital transmit signal; and a first multi-rate adaptive filter that transforms the first set of signal components into the first digital interference cancellation signal according to the first configuration state.

7. The system of claim 6, wherein the sampling digital canceller comprises: a second signal component generation system, coupled to the digital transmit signal, that generates a second set of signal components from the digital transmit signal; and a second multi-rate adaptive filter that transforms the second set of signal components into the second digital interference cancellation signal according to the second configuration state.

8. The system of claim 7, wherein the receive-band digital canceller digital canceller comprises: a third signal component generation system, coupled to the cleaned digital transmit signal, that generates a third set of signal components from the cleaned digital transmit signal; and a third multi-rate adaptive filter that transforms the third set of signal components into the third digital interference cancellation signal according to the third configuration state.

9. A system for out-of-band interference mitigation comprising:

a transmit digital canceller, communicatively coupled to a digital transmit signal of a communication system, that samples and then transforms the digital transmit signal to create a first digital interference cancellation signal; wherein the transmit digital canceller transforms the digital transmit signal according to a first configuration state; wherein the digital transmit signal is ultimately upconverted by the communication system to a radio frequency (RF) transmit signal having a first RF carrier frequency in a transmit band;

a first digital-to-analog-converter (DAC) that converts the first digital interference cancellation signal to a first baseband (BB) interference cancellation signal;

a first frequency upconverter that converts the first BB interference cancellation signal to a first RF interference cancellation signal having the first RF carrier frequency in the transmit band;

a first receive coupler, communicatively coupled to an RF receive signal of the communication system having a second RF carrier frequency in a receive band, that combines, in order to remove a first portion of interference in the transmit band, the first RF interference cancellation signal and the RF receive signal to generate a composite RF receive signal; wherein the composite RF receive signal is ultimately downconverted by the communication system to a composite digital receive signal;

a sampling digital canceller, communicatively coupled to the digital transmit signal of the communication system, that samples and then transforms the digital transmit signal to create a second digital interference cancellation signal; wherein the sampling digital canceller transforms the digital transmit signal according to a second configuration state;

a cleaning coupler that combines, in order to remove interference in the transmit band, the digital transmit signal and the second digital interference cancellation signal to generate a cleaned digital transmit signal;

a receive-band digital canceller that converts the cleaned digital transmit signal to a third digital interference cancellation signal; wherein the receive-band digital canceller transforms the cleaned digital transmit signal according to a third configuration state; wherein the third digital interference cancellation signal is combined with the composite digital receive signal in order to remove a second portion of interference in the receive band.

10. The system of claim 9, further comprising a first transform adaptor that receives the composite RF receive signal from the receive path; wherein the first transform adaptor sets the first and second configuration states based on changes in the composite RF receive signal.

11. The system of claim 10, wherein the composite RF receive signal is converted to a digital signal prior to reception by the transform adaptor.

12. The system of claim 11, further comprising a second transform adaptor that samples the composite digital receive signal after combination with the third digital interference cancellation signal; wherein the second transform adaptor sets the third configuration state based on changes in the composite digital receive signal.

13. The system of claim 9, wherein the transmit band and the receive band are non-overlapping.

14. The system of claim 9, wherein the transmit digital canceller comprises: a first signal component generation system, coupled to the digital transmit signal, that generates a first set of signal components from the digital transmit signal; and a first multi-rate adaptive filter that transforms the first set of signal components into the first digital interference cancellation signal according to the first configuration state.

15. The system of claim 14, wherein the sampling digital canceller comprises: a second signal component generation system, coupled to the digital transmit signal, that generates a second set of signal components from the digital transmit signal; and a second multi-rate adaptive filter that transforms the second set of signal components into the second digital interference cancellation signal according to the second configuration state.

16. The system of claim 15, wherein the receive-band digital canceller digital canceller comprises: a third signal component generation system, coupled to the cleaned digital transmit signal, that generates a third set of signal components from the cleaned digital transmit signal; and a third multi-rate adaptive filter that transforms the third set of signal components into the third digital interference cancellation signal according to the third configuration state.

* * * * *